United States Patent
Lee

(10) Patent No.: US 10,182,660 B2
(45) Date of Patent: Jan. 22, 2019

(54) BED FRAME ASSEMBLED BY SNAPPING WEDGE INSERTS INTO SLOTS

(71) Applicant: Zinus Inc., San Leandro, CA (US)

(72) Inventor: Youn Jae Lee, Pleasanton, CA (US)

(73) Assignee: Zinus Inc., Tracy, CA (US)

( * ) Notice: Subject to any disclaimer, the term of this patent is extended or adjusted under 35 U.S.C. 154(b) by 111 days.

(21) Appl. No.: 15/197,762

(22) Filed: Jun. 30, 2016

(65) Prior Publication Data

US 2017/0208955 A1   Jul. 27, 2017

Related U.S. Application Data

(63) Continuation-in-part of application No. 15/004,762, filed on Jan. 22, 2016.

(51) Int. Cl.
*A47C 19/02* (2006.01)
*A47C 19/20* (2006.01)
*A47C 19/00* (2006.01)
*F16B 12/58* (2006.01)

(52) U.S. Cl.
CPC .......... *A47C 19/025* (2013.01); *A47C 19/005* (2013.01); *F16B 12/58* (2013.01)

(58) Field of Classification Search
CPC .......... F16B 12/26; F16B 12/38; F16B 12/54; F16B 12/56; F16B 12/58; F16B 12/60; A47C 19/02; A47C 19/024; A47C 19/025
See application file for complete search history.

(56) References Cited

U.S. PATENT DOCUMENTS

| | | | | |
|---|---|---|---|---|
| 1,826,421 A | * | 10/1931 | Butkus | F16B 12/58 5/288 |
| 2,203,780 A | * | 6/1940 | Gatz | A47B 25/003 248/165 |
| 2,793,407 A | * | 5/1957 | Johnston | F16B 12/20 403/182 |
| 3,683,429 A | * | 8/1972 | Mis | A47C 19/024 5/201 |
| 3,760,437 A | * | 9/1973 | Hooker | A47C 19/005 5/201 |
| 4,155,131 A | * | 5/1979 | Harris | A47C 19/005 312/263 |
| 4,430,947 A | * | 2/1984 | Kvame | A47F 5/11 108/108 |
| 5,522,101 A | * | 6/1996 | Yeh | A47C 19/005 403/334 |

(Continued)

*Primary Examiner* — Robert G Santos
*Assistant Examiner* — Rahib T Zaman
(74) *Attorney, Agent, or Firm* — Imperium Patent Works; Darien K. Wallace

(57) ABSTRACT

A bed frame includes legs, bars and wooden slats. Each leg has first and second sides that meet each other at an edge. A first slot is disposed on the first side adjacent to the edge, and a second slot is disposed on the second side adjacent to the edge. Each bar has two wedge inserts. A first wedge on a lateral bar fits into the first slot, and a second wedge on a longitudinal bar fits into the second slot. The lateral bar is perpendicular to the leg while the first wedge is lodged in the first slot, and the longitudinal bar is perpendicular to the leg while the second wedge is lodged in the second slot. The first slot and the second slot are disposed between the lateral bar and the longitudinal bar while the first and second wedge inserts are lodged in the first and second slots.

20 Claims, 18 Drawing Sheets

(56) References Cited

U.S. PATENT DOCUMENTS

| | | | | |
|---|---|---|---|---|
| 5,694,656 | A * | 12/1997 | Huang | A47C 19/005 297/440.1 |
| 6,637,052 | B2 * | 10/2003 | Nockles | A47C 4/021 5/131 |
| 6,826,790 | B1 * | 12/2004 | Polevoy | A47C 19/024 248/345.1 |
| 8,869,324 | B1 * | 10/2014 | Lin | A47C 19/02 5/200.1 |
| 2005/0278848 | A1 * | 12/2005 | Polevoy | A47C 19/005 5/201 |
| 2010/0242171 | A1 * | 9/2010 | Polevoy | A47C 19/005 5/282.1 |
| 2011/0219537 | A1 * | 9/2011 | Lin | A47C 19/021 5/9.1 |
| 2014/0023433 | A1 * | 1/2014 | Blakeman | F16B 12/26 403/361 |
| 2014/0259396 | A1 * | 9/2014 | McCarty | A47C 19/005 5/400 |
| 2015/0208811 | A1 * | 7/2015 | Polevoy | A47C 19/025 5/200.1 |

* cited by examiner

BED FRAME ASSEMBLED BY SNAPPING WEDGE INSERTS INTO SLOTS

CROSS REFERENCE TO RELATED APPLICATION

This application is a continuation-in-part of, and claims priority under 35 U.S.C. § 120 from, nonprovisional U.S. patent application Ser. No. 15/004,762 entitled "Snap Assembly of Mattress Supporting System," filed on Jan. 22, 2016, the subject matter of which is incorporated herein by reference.

TECHNICAL FIELD

The described embodiments relate to bedding products, and more particularly to a folding bed frame and a mattress supporting system.

BACKGROUND INFORMATION

Conventional bed frames are relatively heavy and awkward. FIG. 1 (prior art) shows the structure of a conventional bed frame 10 including two opposing side rails 11 with a plurality of cross bar members 12 extending between the side rails. Bed frame 10 also includes a center beam 13 that is parallel to the side rails and located at the center of the bed frame in order to provide additional support to a box spring and mattress. The side rails 11 and cross bar members 12 are typically formed from elongated pieces of steel having an L-shaped cross-section (also called angle iron). A horizontal flange of each side rail 11 supports the box spring, and a vertical flange prevents each side rail from bending under the weight of the box spring, the mattress and the occupants of the bed. Thus, the angular arrangement of the side rails is required for structural integrity. Edge attachments 14 are screwed to the ends of the side rails 11 to prevent the box spring from sliding past the head of the bed frame 10. The edge attachments 14 have sharp metal edges located at the level of the shins of persons walking around the bed frame 10, for example during assembly. In addition, downwardly extending support legs typically screw into threaded leg holders attached to cross bar members 12, center beam 13 and/or side rails 11. The bed frame 10 may support the box spring on loose wooden slats spanning between the side rails or may directly accommodate the box spring.

Conventional bed frames are typically assembled at the location of the bed. The assembly process can be cumbersome because it usually involves many non-intuitive steps and requires the use of multiple tools. The manner in which multiple pieces are connected to form the cross bar members 12 is typically complicated and can require tools. In addition, the support legs must be screwed or bolted to the cross bar members 12 or side rails 11. Another shortcoming of conventional bed frames is the relatively heavy weight, due primarily to the weight of the angle irons from which side rails 11 and cross bar members 12 are made. The heavy weight results in higher shipping costs and difficulty of assembly.

Thus, a light-weight bed frame is sought that is less complicated to assemble and does not require tools to connect the components. The easily assembled bed frame should nevertheless be sturdy and should fit inside a compact shipping box. The bed frame should prevent the mattress from sliding past the head of the bed without using edge attachments that can injure the shins and feet of users walking around the foot of the bed frame.

SUMMARY

A bed frame assembly for supporting a mattress includes lateral bars, longitudinal bars, support legs and wooden slats. Each support leg has two triangular slots, and each bar has two wedge inserts. A first triangular slot opens from the first side of a support leg, and a second triangular slot opens from a perpendicular, second side of the support leg. A first wedge insert on a lateral bar fits into the first triangular slot. The lateral bar is oriented perpendicular to the support leg while the first wedge insert is lodged in the first triangular slot. A second wedge insert on a longitudinal bar fits into the second triangular slot. The longitudinal bar is oriented perpendicular to the support leg while the second wedge insert is lodged in the second triangular slot. Corresponding wedge inserts and triangular slots are identified by the same numerals and enable the snap assembly of the bed frame assembly. By matching the numerals displayed on or near corresponding wedge inserts and triangular slots, the user can intuitively assemble the bed frame assembly by the numbers. The wooden slats are then placed on ledges on the inner sides of the longitudinal bars and span between the bars. The wooden slats are attached to one another by fabric ribbons made of hook and loop fastening material. The slats are held in place on the ledges by the ribbons that stick to strips of fastening material on the ledges.

Each triangular slot is formed by a bent sheet of metal welded to a side of a support leg. The angle that the triangular slot forms with the side of the support leg is approximately equal to the angle made by the corresponding wedge insert. The first wedge insert has a slanted outer surface that contacts an inside hypotenuse surface of the first triangular slot while the first wedge insert is lodged in the first triangular slot. In one embodiment, a bent lip projects from the slanted outer surface of the wedge insert and catches on an edge of the inside hypotenuse surface of the triangular slot when the wedge insert is completely inserted into the triangular slot. In another embodiment, the first wedge insert has a notch that faces the first side of the support leg while the first wedge insert is lodged in the first triangular slot. The first triangular slot has a shaft at its upper lip along the first side of the support leg. The shaft fits into the notch when the first wedge insert snaps into the first triangular slot.

A method of assembling the bed frame assembly starts with the user removing the four bars, four legs, the wooden slats and the user instructions from the packing box. The user begins to assemble the bed frame assembly by inserting the wedge insert identified by the numeral "1" into the corresponding triangular slot that is also identified by the numeral "1". Then the user inserts the wedge insert marked as "2" into the triangular slot marked "2". The first wedge insert marked as "2" is disposed on a lower side of a lateral bar of the bed frame assembly. The first triangular slot marked as "2" opens from a first side of a first support leg of the bed frame assembly. A second side of the first support leg is perpendicular to the first side. The first wedge insert is inserted into the first triangular slot until the first wedge insert snaps into the first triangular slot.

Then a second wedge insert marked as "3" is inserted into a second triangular slot marked as "3". The second wedge insert is disposed on a bottom side of a longitudinal bar of the bed frame, and the second triangular slot opens from the second side of the first support leg. When both the first wedge insert marked as "2" is inserted into the first triangular slot marked as "2" and the second wedge insert marked as "3" is inserted into the second triangular slot marked as "3", the lateral bar is perpendicular to the longitudinal bar. Then a third wedge insert marked as "4" is inserted into a third triangular slot marked as "4". The third wedge insert is disposed on the bottom side of the longitudinal bar, and the third triangular slot is disposed on a second support leg of the bed frame. The user then continues the assembly by inserting wedge inserts into triangular slots both marked with "5", "6", "7" and "8".

In another embodiment, a sturdy, easily assembled bed frame assembly includes support legs, lateral bars and longitudinal bars. A support leg has a first side, a second side, a first slot and a second slot. The first side is perpendicular to the second side and meets the second side at an edge. The first slot is disposed on the first side adjacent to the edge, and the second slot is disposed on the second side adjacent to the edge. A first wedge insert is attached to a lateral bar and fits into the first slot. The first wedge insert has a first wedge angle that is approximately equal to a first slot angle formed by the first slot. In one aspect, the first wedge insert is held in the first slot by friction without using any rotating fastener. In another aspect, the first wedge insert snaps into the first slot. While the first wedge insert is lodged in the first slot, the lateral bar is oriented perpendicular to the support leg, and the first wedge insert is disposed between the edge and the lateral bar. A second wedge insert is attached to a longitudinal bar and fits into the second slot. While the second wedge insert is lodged in the second slot, the longitudinal bar is oriented perpendicular to the support leg, and the second wedge insert is disposed between the edge and the longitudinal bar.

In yet another embodiment, a bed frame assembly includes a leg, a lateral bar and a longitudinal bar. The leg has a first slot and a second slot. The first slot has a first inner slanted surface, and the second slot has a second inner slanted surface. The lateral bar has a first wedge insert that is adapted to lodge in the first slot. The first wedge insert has a first slanted outer surface that is adapted to contact the first inner slanted surface while the first wedge insert is lodged in the first slot. The lateral bar is perpendicular to the leg while the first wedge insert is lodged in the first slot.

The longitudinal bar has a second wedge insert that is adapted to lodge in the second slot. The second wedge insert has a second slanted outer surface that is adapted to contact the second inner slanted surface while the second wedge insert is lodged in the second slot. The longitudinal bar is perpendicular to the leg and perpendicular to the lateral bar while both the second wedge insert is lodged in the second slot and the first wedge insert is lodged in the first slot. Both the first slot and the second slot are disposed between the lateral bar and the longitudinal bar while the first and second wedge inserts are lodged in the first and second slots. The leg has a first side and a second side that meet each other at an edge. The first slot is disposed on the first side adjacent to the edge, and the second slot is disposed on the second side adjacent to the edge.

Further details and embodiments are described in the detailed description below. This summary does not purport to define the invention. The invention is defined by the claims.

BRIEF DESCRIPTION OF THE DRAWINGS

The accompanying drawings illustrate embodiments of the invention.

DETAILED DESCRIPTION

Figure 1:
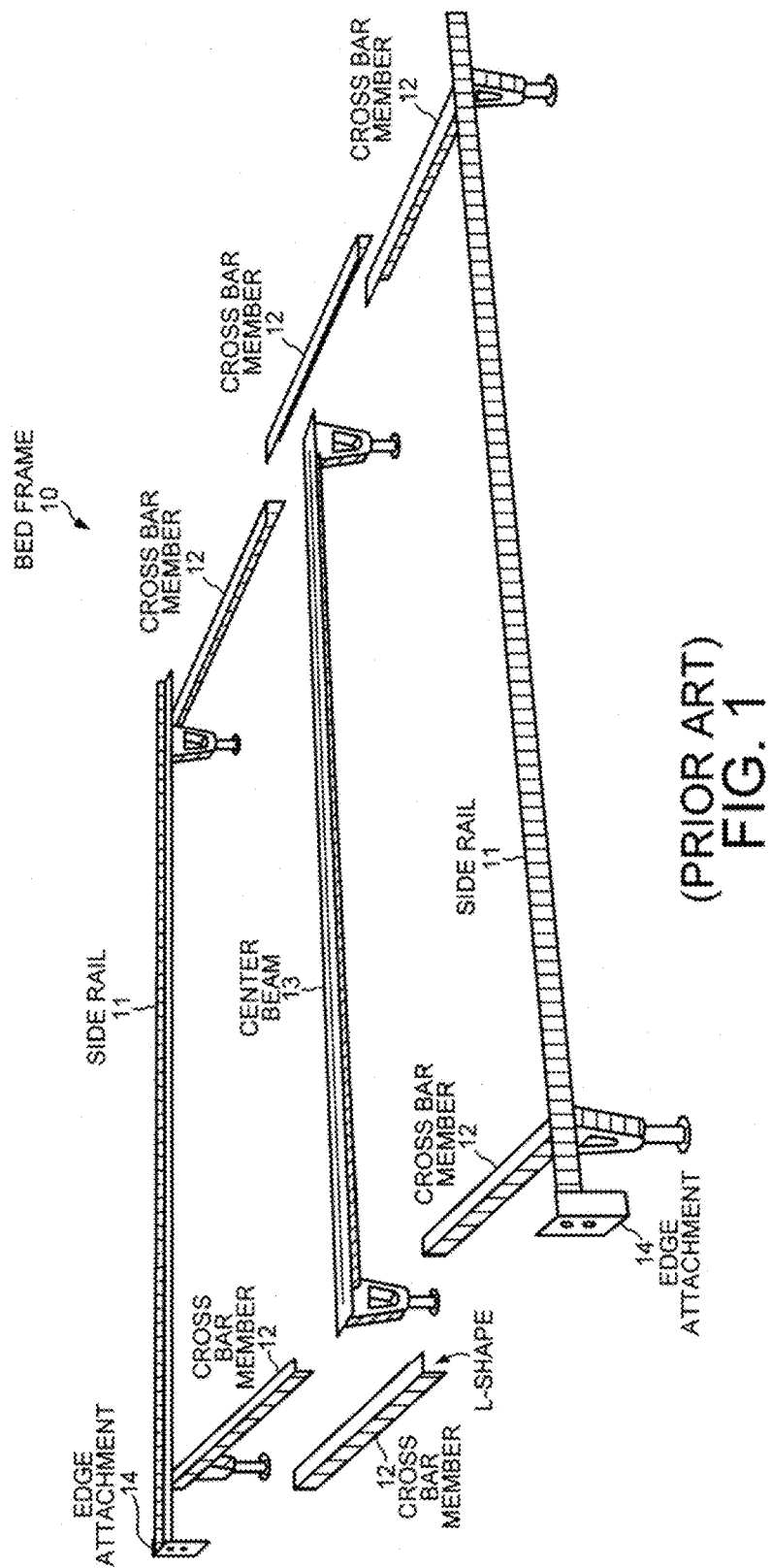
FIG. 1 (prior art) is a perspective view of a prior art bed frame with each rail having an L shape.
Figure 2:
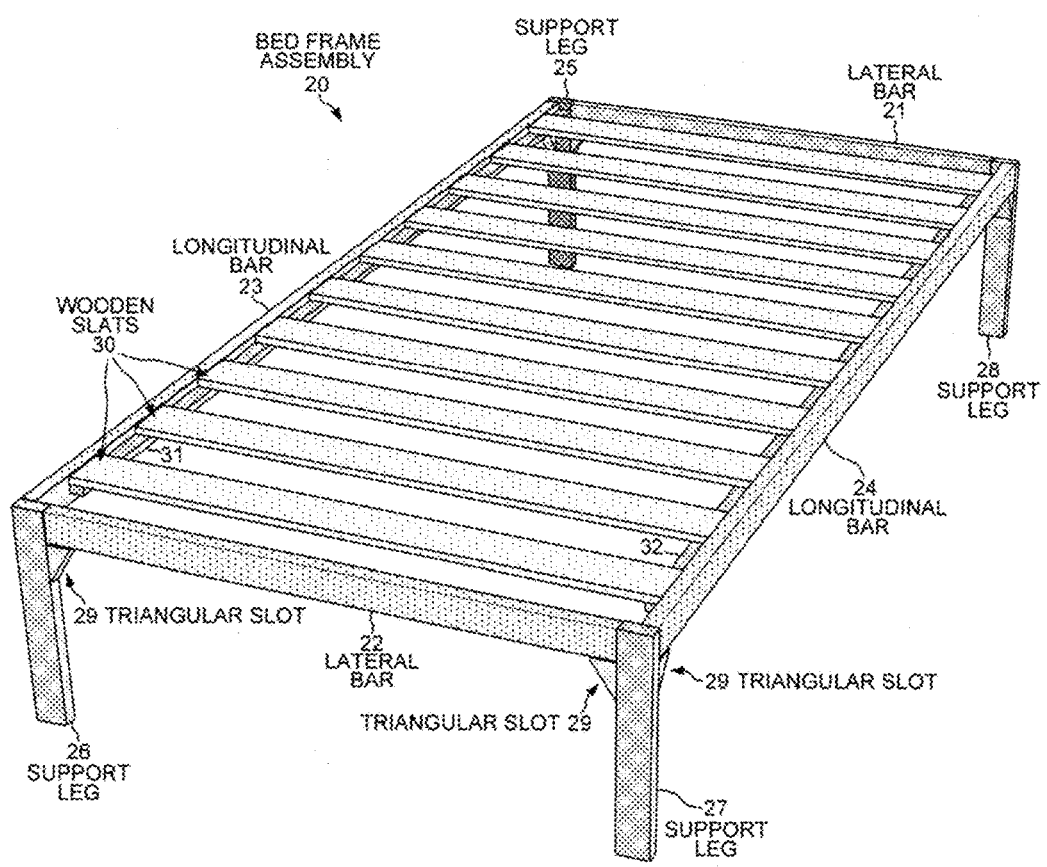
FIG. 2 is a perspective view of a novel bed frame that is easily assembled without tools.

FIG. 2 is a perspective view of a novel bed frame assembly 20 that can be easily assembled without tools by snapping wedge retention inserts into triangular slots. Bed frame assembly 20 is a mattress supporting system upon which a mattress can be directly placed without any intervening box springs. Bed frame assembly 20 is light weight but nevertheless sturdy. Most important, bed frame assembly 20 is easily and intuitively assembled without using tools. FIG. 2 shows a twin sized version of the mattress supporting system. However, the queen and king sized versions can be made using the same inventive concepts. Bed frame assembly 20 has only eight metal components. The queen sized version can also be made from just eight metal pieces, while the king sized version includes an additional bar and leg.

Bed frame assembly 20 includes two lateral bars 21-22, two longitudinal bars 23-24 and four support legs 25-28. Each of the support legs 25-28 has two triangular slots 29. In addition, bed frame assembly 20 includes ten wooden slats 30 that span between the two longitudinal bars 23-24. The ends of the wooden slats 29 rest on metal ledges 31-32 that are welded to the inner sides of the longitudinal bars 23-24. The metal ledges 31-32 are positioned lower on the inner sides of the longitudinal bars 23-24 such that the upper surfaces of the wooden slats 30 are below the top sides of the longitudinal bars 23-24 and below the upper sides of the lateral bars 21-22. The tops of the longitudinal and lateral bars for a lip around the upper surfaces of the wooden slats 30 on which the mattress rests. This lip holds the mattress in place and prevents the mattress from sliding past the head or foot of the bed frame without using any edge attachments attached to the longitudinal bars.

Figure 3:
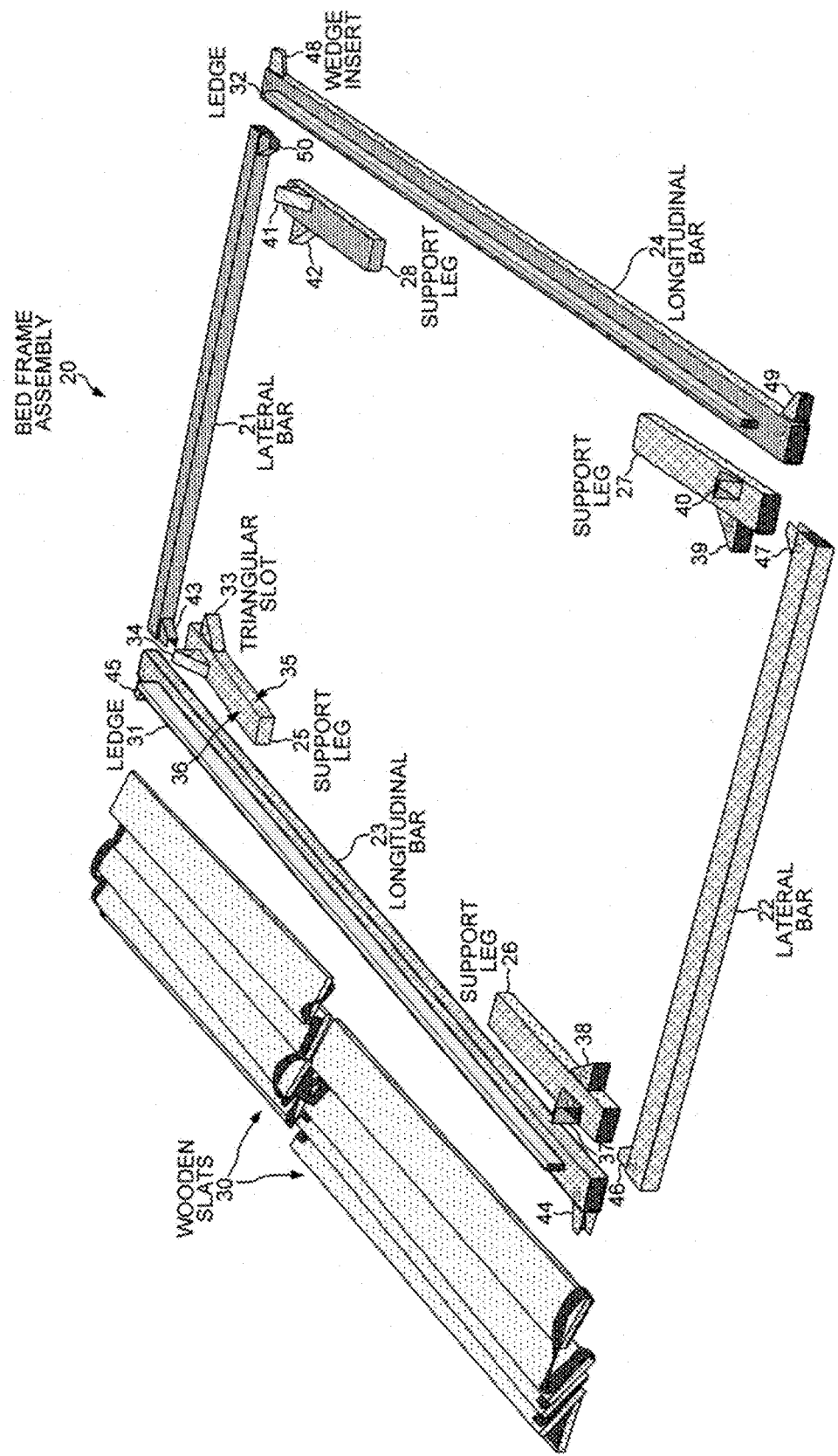
FIG. 3 shows the bed frame of FIG. 2 in an unassembled state such as how the components would appear when a user first removes them from a packing box.

FIG. 3 shows bed frame assembly 20 in an unassembled state such as how the components would appear when the user first removes them from the packing box. FIG. 3 shows that each support leg 25-28 has two triangular slots. For example, a first support leg 25 includes a first triangular slot 33 and a second triangular slot 34. First support leg 25 has a first side 35 that is perpendicular to a second side 36. The first triangular slot 33 opens from the first side 35, and the second triangular slot 34 opens from the second side 36. Thus, the first triangular slot 33 extends from the first support leg 25 in a direction perpendicular to the direction in which the second triangular slot 34 extends from the first support leg 25. The second support leg 26 has two triangular slots 37-38; the third support leg 27 has two triangular slots 39-40; and the fourth support leg 28 has two triangular slots 41-42. FIG. 3 also shows that each of the bars 21-24 includes two of the wedge retention insert fasteners 43-50. The first lateral bar 21 has two wedge inserts 50 and 43. The first longitudinal bar 23 includes the two wedge inserts 44-45. The second lateral bar 22 includes the two wedge inserts 46-47, and the second longitudinal bar 24 includes the two wedge inserts 48-49.

Each wedge insert is identified by a numeral that corresponds to the numeral displayed on the triangular slot into which the particular wedge insert must be inserted in order to assemble the bed frame assembly 20. For example, the numeral "2" is printed on a round label that is stuck to the inner side of the first lateral bar 21, and the same numeral "2" is printed on a round label that is stuck to the inner triangular side of the first triangular slot 33. By identifying wedge inserts and their corresponding triangular slots by number, the user can intuitively assemble the bed frame by inserting each wedge insert into the correct triangular slot in the proper order.

For example, the user begins the assembly of the bed frame by inserting the wedge insert 50 identified by the numeral "1" into the triangular slot 42 also identified by the numeral "1". Then the user inserts the wedge insert 43 marked as "2" into the triangular slot 33 marked "2". Next, the user inserts the wedge insert 44 marked as "3" into the triangular slot 34 marked "3". The user continues the assembly by inserting wedge inserts into triangular slots both marked with "4", "5", "6", "7" or "8". Note that the user would have to rotate first longitudinal bar 23 by 180° so that the numeral "3" that is displayed near the wedge insert 44 matches the numeral "3" that is displayed on the triangular slot 34. Similarly, the user would have to rotate second longitudinal bar 24 by 180° so that the numeral "7" that is displayed near the wedge insert 48 matches the numeral "7" that is displayed on the triangular slot 40. Thus, by matching the numerals displayed on or near the wedge inserts and triangular slots, the user can intuitively assemble the bed frame assembly 20 by the numbers.

Figure 4:
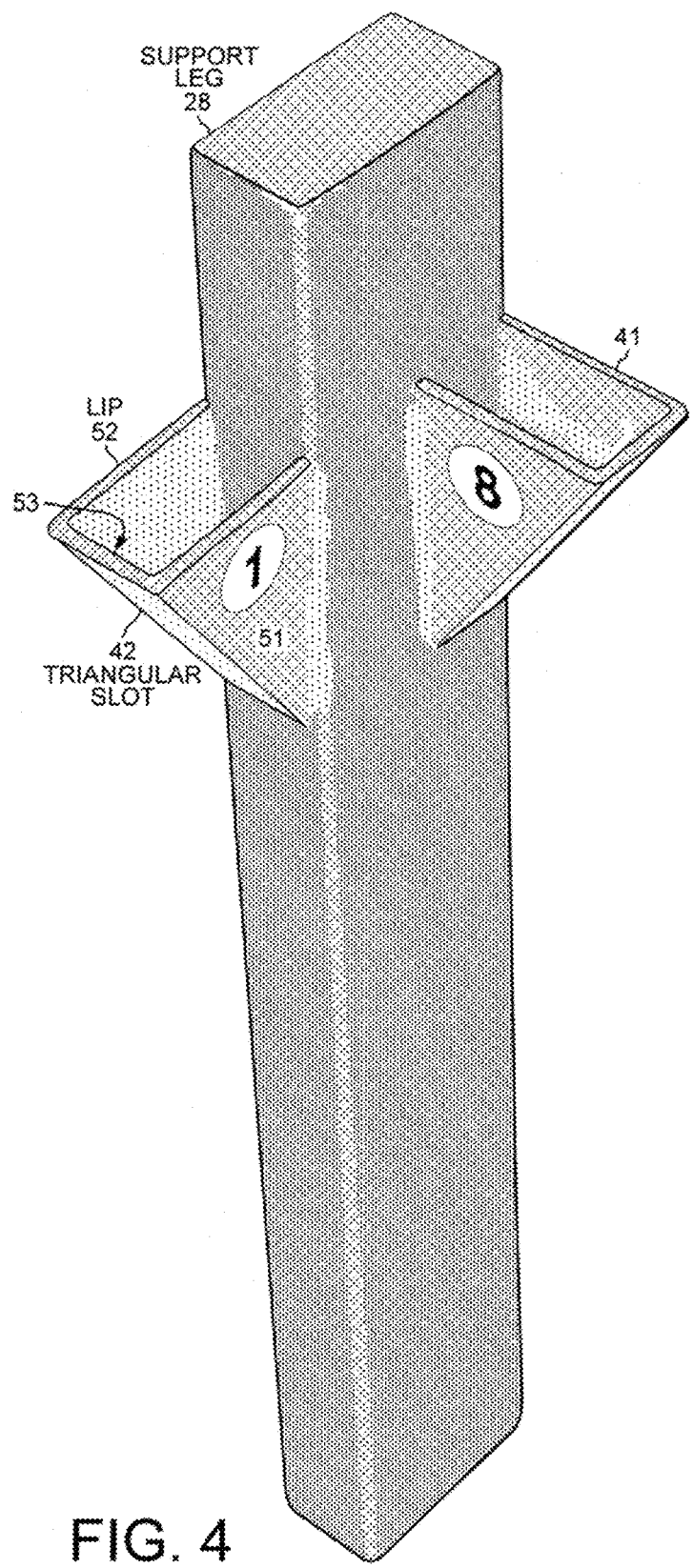
FIG. 4 is a more detailed view of a support leg with triangular slots as shown in FIG. 3.

FIG. 4 is a more detailed view of support leg 28 to which triangular slots 41-42 are attached. The user begins assembling bed frame assembly 20 by inserting the corresponding wedge insert into the triangular slot 42 on which the numeral "1" is displayed. In this embodiment, a round sticker with the numeral "1" is stuck with adhesive to the triangular side 51 of triangular slot 42 that will face towards the inside of bed frame assembly 20. Triangular slot 42 is formed from a bent sheet of metal welded along two edges to a side of support leg 28. The sheet of metal is cut so that the upper lip 52 of triangular slot 42 is perpendicular to the side of support leg 28. Triangular slot 42 forms a wedge-shaped pocket on the side of support leg 28 with a rectangular slot opening. The diagonal surface on the inside of the pocket forms an inside hypotenuse surface 53 of triangular slot 42. When a wedge insert is lodged in triangular slot 42, a slanted outer surface of the wedge insert contacts inside hypotenuse surface 53.

Figure 5:
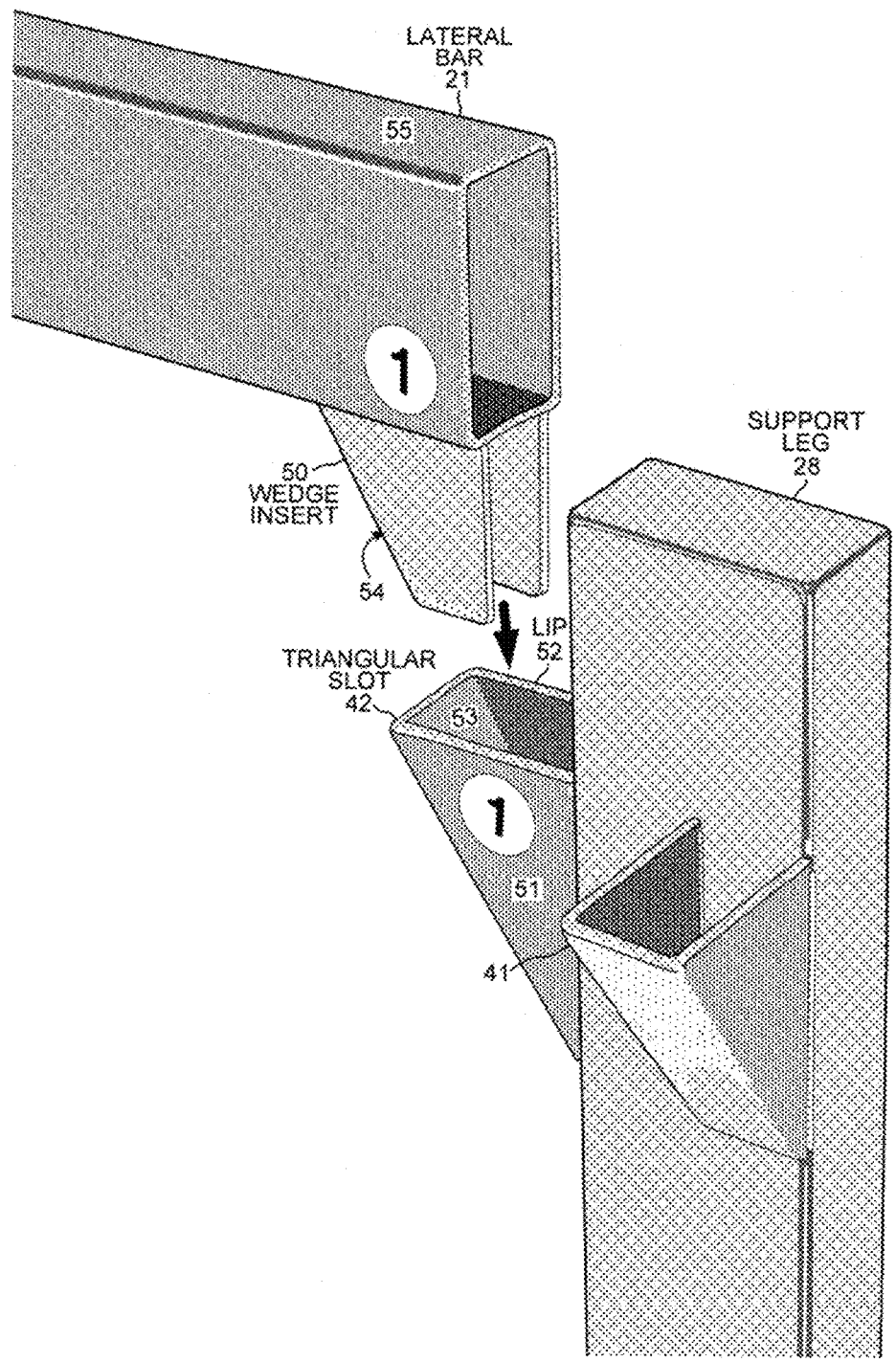
FIG. 5 illustrates how a wedge insert is inserted into a triangular slot of the support leg of FIG. 4.

FIG. 5 illustrates how wedge insert 50 is pushed down into triangular slot 42 in the first step of assembling bed frame assembly 20. In this embodiment, a round sticker with the numeral "1" is stuck with adhesive to the inner side of lateral bar 21 above wedge insert 50. The numeral "1" displayed above wedge insert 50 identifies the wedge as being associated with triangular slot 42. FIG. 5 shows inside hypotenuse surface 53 over which the slanted outer surface 54 of wedge insert 50 slides as the wedge insert is being inserted into triangular slot 42. For example, wedge insert 50 can be pushed down into triangular slot 42 by stamping the heal of the user's shoe on the upper side 55 of lateral bar 21 above wedge insert 50. In one embodiment, the friction of wedge insert 50 being lodged in triangular slot 42 retains the wedge in the slot and attaches lateral bar 21 to support leg 28. No rotating fastener, such as a screw, bolt or pin, is used to hold wedge insert 50 in place in triangular slot 42. Wedge insert 50 has no moving parts. Wedge insert 50 is formed from a bent sheet of metal welded to the lower side of lateral bar 21. The vertical side of wedge insert 50 that faces the end of the bar is open. The vertical edges of the metal sheet that face the end of the bar contact the side of support leg 28 when wedge insert 50 is lodged in triangular slot 42.

FIG. 5 shows that lateral bar 21 is hollow and has a rectangular cross section. In fact, all of the lateral and longitudinal bars 21-24 and the support legs 25-28 are made from hollow, rectangular metal bars. The hollow, rectangular metal construction of the bars provides a stronger structure with less weight. The hollow, rectangular metal bars provide stronger structures than would solid bars of the same weight of metal.

Figure 6:
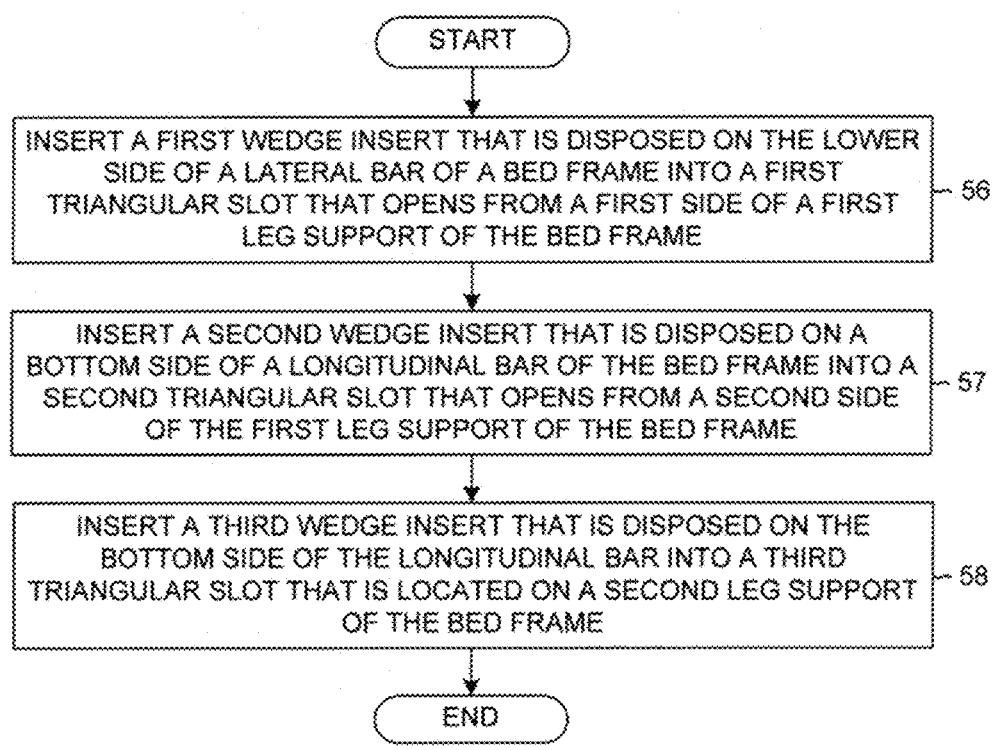
FIG. 6 is a flowchart illustrating steps of a method of assembling the bed frame of FIG. 2.
Figure 7:
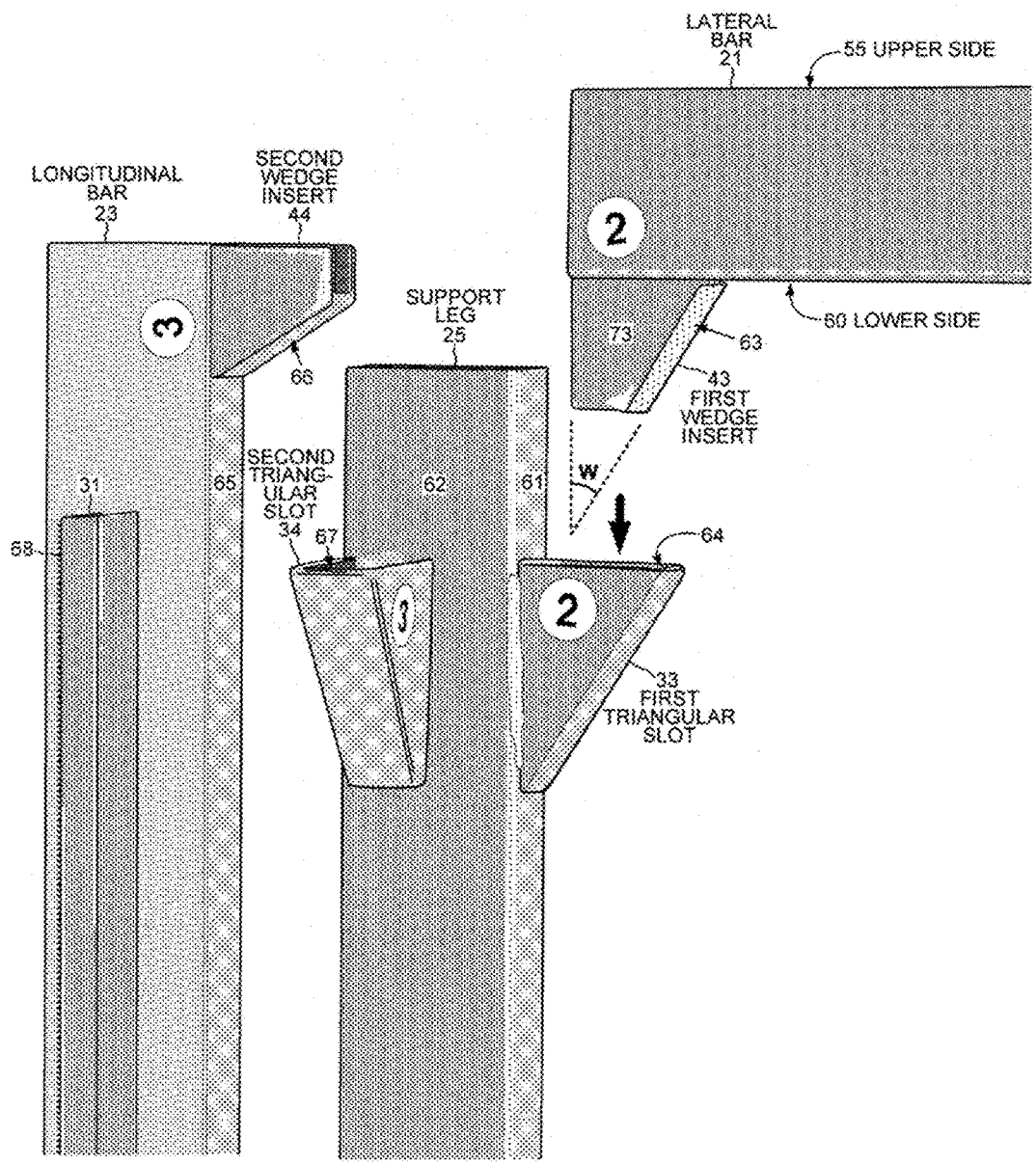
FIG. 7 illustrates how another wedge insert is inserted into a triangular slot of another support leg of the bed frame of FIG. 2.

FIG. 6 is a flowchart illustrating the next steps 56-58 of the method of assembling bed frame assembly 20. The steps 56-58 of the method of FIG. 6 are described in relation to the components of bed frame assembly 20 shown in FIG. 7. In a next step 56, a first wedge insert 43 that is disposed on the lower side 60 of lateral bar 21 is inserted into a first triangular slot 33 that opens from a first side 61 of first support leg 25. First triangular slot 33 is identified by a first numeral "2" displayed on the first triangular slot, and first wedge insert 43 is identified by the same first numeral "2" displayed near the wedge. The first side 61 is perpendicular to a second side 62 of first support leg 25, and a second triangular slot 34 opens from the second side 62. First wedge insert 43 has a first slanted outer surface 63 that contacts a first inner hypotenuse surface 64 of first triangular slot 33 when first wedge insert 43 is lodged in first triangular slot 33. Despite the fact that first wedge insert 43 does not have a wedge tip, insert 43 is nevertheless wedge-shaped and has a first wedge angle W, as shown in FIG. 7. First triangular slot 33 forms a first slot angle, which is the angle between the slanted outer surface of slot 33 and the first side 61 of first support leg 25. FIG. 7 shows that the first slot angle is approximately equal to the first wedge angle W.

Figure 8:
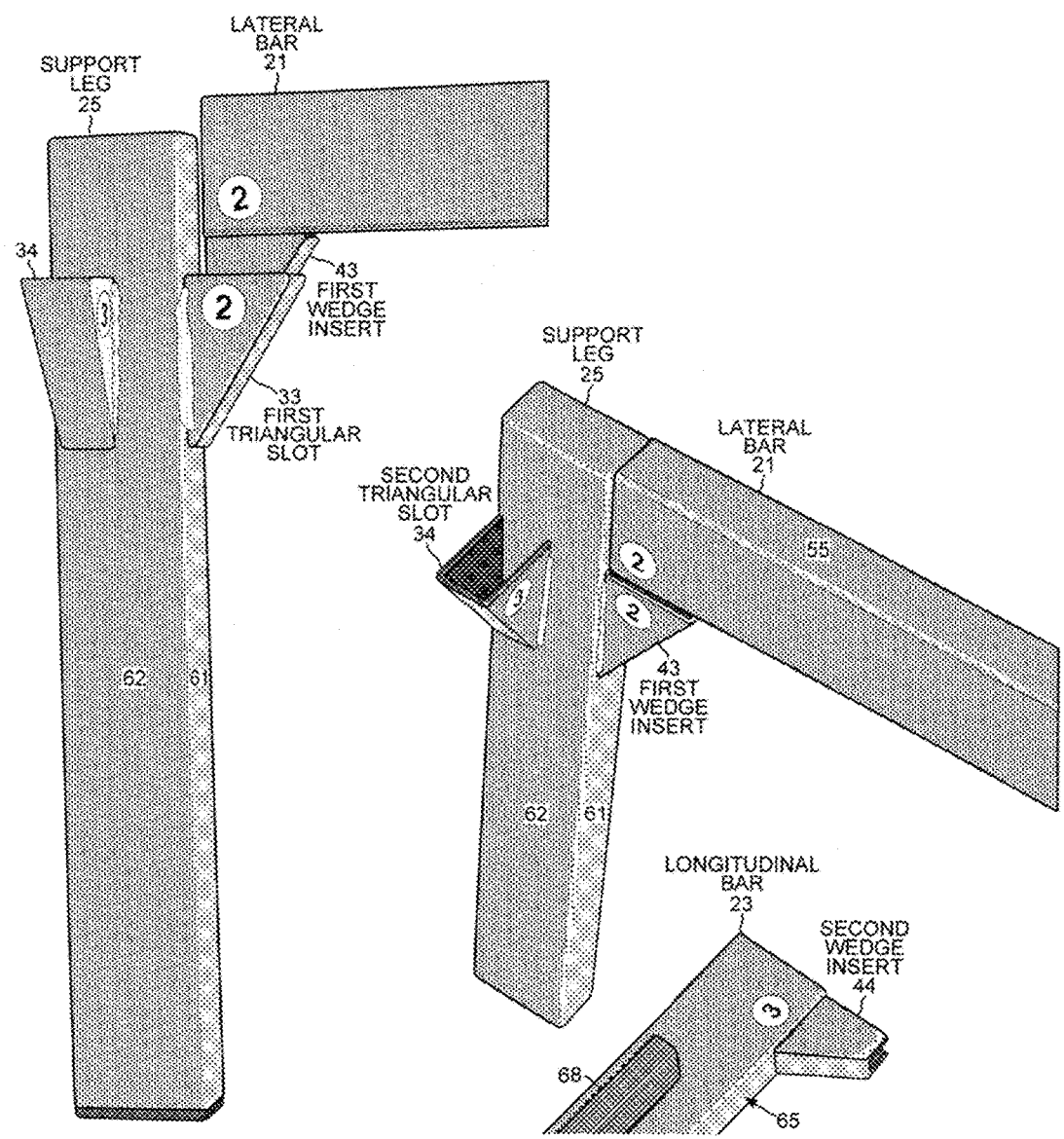
FIG. 8 shows various stages of the wedge insert of FIG. 7 being inserted into the triangular slot.

FIG. 8 shows various stages of first wedge insert 43 being inserted into first triangular slot 33. The left side of FIG. 8 shows first wedge insert 43 partially inserted into first triangular slot 33 with first slanted outer surface 63 sliding along first inner hypotenuse surface 64 of first triangular slot 33. The right side of FIG. 8 shows first wedge insert 43 nearly completely inserted into first triangular slot 33. A consumer who is assembling bed frame 20 can completely insert first wedge insert 43 into first triangular slot 33 such that the wedge locks into the slot by stamping the consumer's foot on the upper side 55 of lateral bar 21 above wedge insert 43. Thus, first wedge insert 43 is a means for attaching lateral bar 21 to first triangular slot 33 using friction and without using any rotating fastener or tools.

In step 57, second wedge insert 44 that is disposed on a bottom side 65 of longitudinal bar 23 is inserted into second triangular slot 34. Second triangular slot 34 is identified by a second numeral "3" displayed on the second triangular slot, and second wedge insert 44 is identified by the same second numeral "3" displayed near the wedge. Second wedge insert 44 has a second slanted outer surface 66 that contacts a second inner hypotenuse surface 67 of second triangular slot 34 when second wedge insert 44 is lodged in second triangular slot 34.

Figure 9:
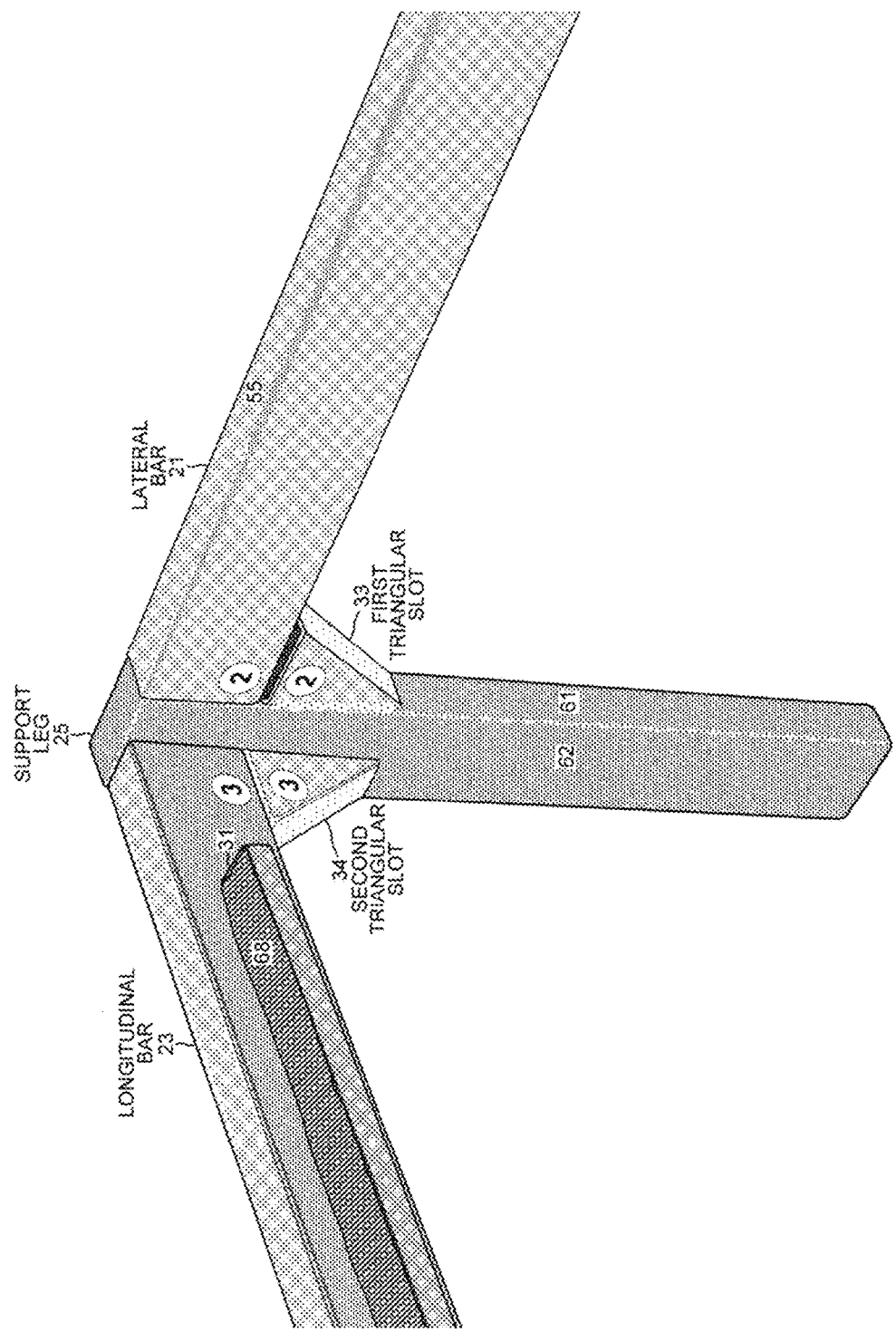
FIG. 9 shows a portion of the bed frame of FIG. 2 after two steps of the method of FIG. 6 have been performed.

FIG. 9 shows a portion of bed frame assembly 20 after steps 56-57 have been performed. By connecting wedge 43 to slot 33 and wedge 44 to slot 34, both lateral bar 21 and longitudinal bar 23 are connected to support leg 25. By connecting wedges and slots with matching numerals in numerical order, a user who is assembling bed frame 20 is intuitively directed to connect the appropriate components to each other. For example, no user directions are necessary to instruct the user to connect support leg 28 to lateral bar 21, and then lateral bar 21 to support leg 25, and then support leg 25 to longitudinal bar 23, etc. By connecting the corresponding wedges and slots in numerical order, the bars and legs of bed frame 20 are necessarily connected in the proper order. Assembling bed frame assembly 20 by the numbers does not require either detailed user instructions or tools.

In step 58, a third wedge insert 45 that is disposed on the bottom side 65 of longitudinal bar 23 is inserted into a third triangular slot 37 that is located on a second support leg 26. In subsequent steps, the wedge inserts of lateral bar 22 and longitudinal bar 24 are inserted into the corresponding triangular slots on support legs 26-28. After the eight metal components of the bed frame 20 are assembled, the two rolls of wooden slats 30 are rolled out to span between the ledges 31-32 on the longitudinal bars 23-24. The upper surfaces of ledges 31-32 are covered with strips 68 of hook and loop fastening material, such as Velcro®, which is used to hold the slats 30 in place. A strip 68 of fastening material on ledge 31 is apparent in FIGS. 7-9.

Figure 10:
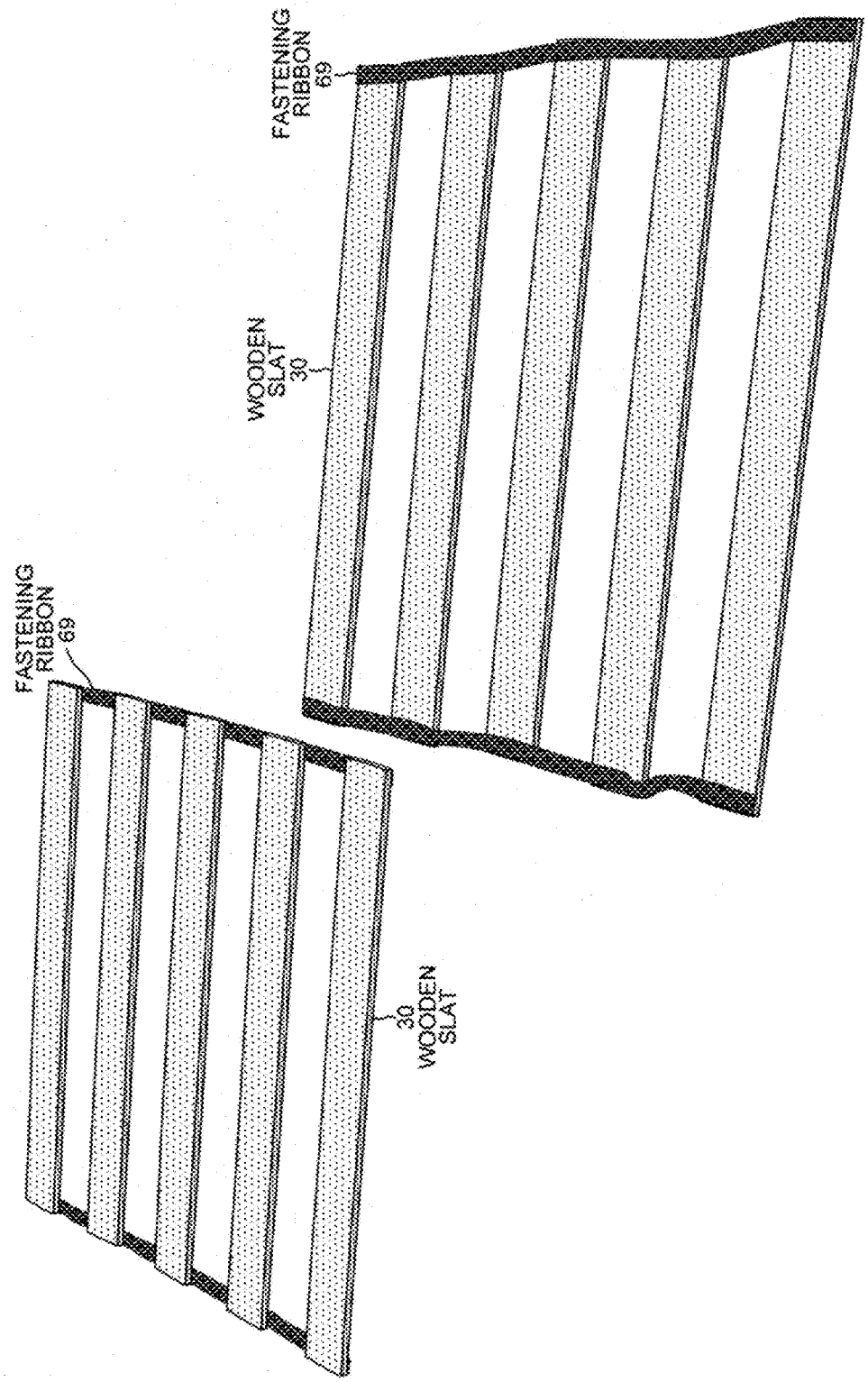
FIG. 10 shows two rolls of wooden slats of the bed frame of FIG. 2 after they have been unrolled.

FIG. 10 shows the two rolls of slats 30 after they have been unrolled. The slats 30 are wooden planks about three feet long and three inches wide. The ten wooden slats 30 are attached to each other near their ends by ribbons 69 made of strong synthetic fabric. In this embodiment, two sets of five slats are connected together. The ribbons 26 are attached to the bottom side of each slat 30, for example by staples, so that the slats can be rolled up or stacked flat against each other as shown in FIG. 3. In the assembly step, the slats 30 are expanded out in parallel between the longitudinal bars 23-24 as shown in FIG. 2. The ends of wooden slats 30 rest on the support ledges 31-32 that are attached to the insides of the bars 23-24. Wooden slats 30 are shown in FIG. 10 as flat boards. In another embodiment, however, wooden slats 30 are bowed such that they rest on support ledges 31-32 but bow upwards between the bars 23-24. The bowed slats can be stacked all in the same bowed orientation.

Figures 11, 12:
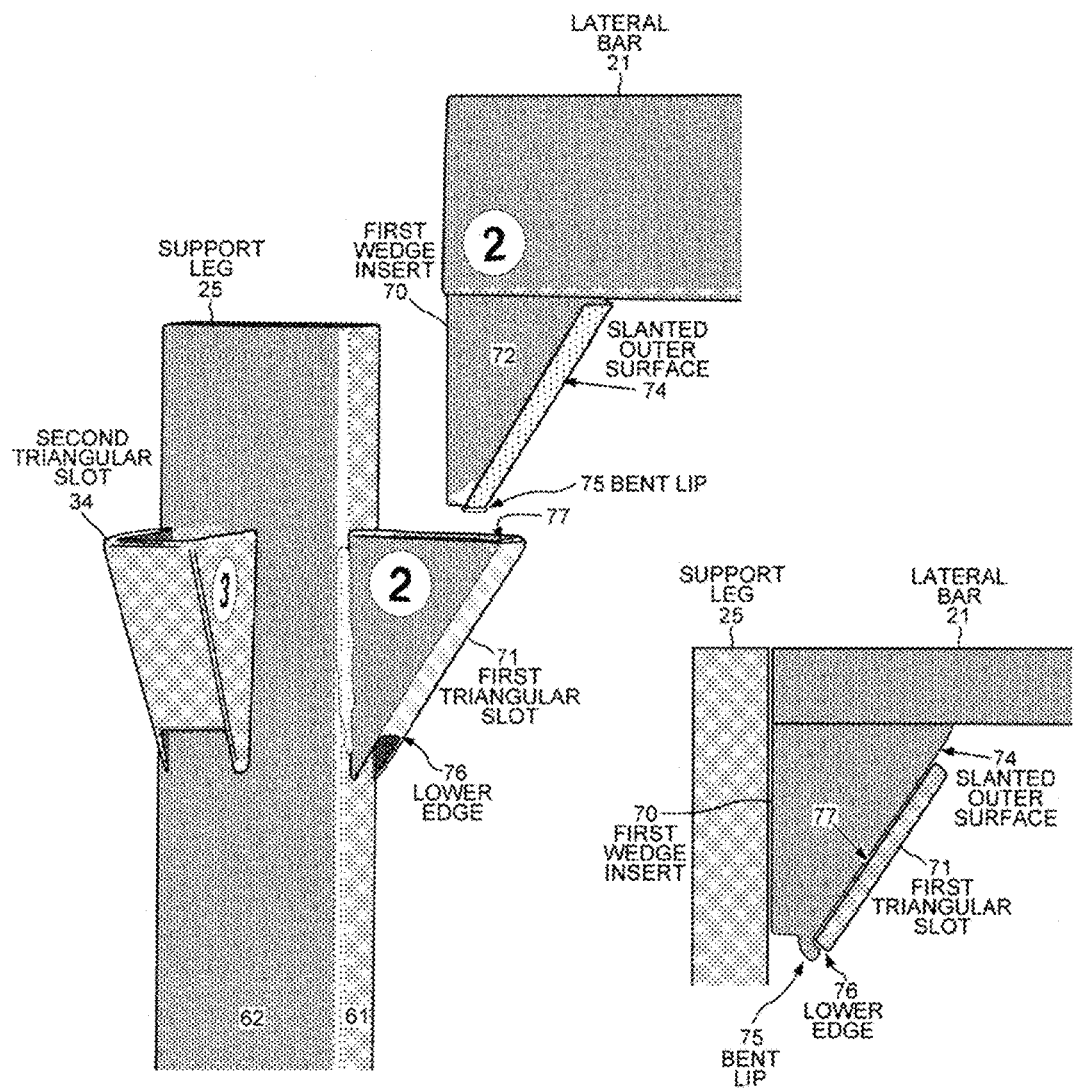
FIG. 11 shows another embodiment of the bed frame of FIG. 2 in which a wedge snaps into a slot when a lip on the wedge snaps past an edge of the slot.
FIG. 12 is a cross-sectional, schematic view of the wedge insert of FIG. 11 having been snapped into a triangular slot.

FIG. 11 shows another embodiment of bed frame assembly 20 in which the wedge inserts exhibit an enhanced snap when they are completely inserted into the triangular slots. FIG. 11 illustrates how a first wedge insert 70 is inserted into a first triangular slot 71 until the insert 70 snaps into the 71. The first wedge insert 70 shown in FIG. 11 has a triangular side 72 that more closely resembles a triangle than does the side 73 of first wedge insert 43 in FIG. 7. Consequently, the slanted outer surface 74 of first wedge insert 70 is longer than the first slanted outer surface 63 of first wedge insert 43 in FIG. 7. A bent lip 75 projects from the bottom end of the longer slanted outer surface 74 and catches on a lower edge 76 of the inside hypotenuse surface 77 when first wedge insert 70 is completely inserted into first triangular slot 71. The lower edge 76 is moved away from the first side 61 of first support leg 25 by making a cutout at the bottom of the slanted surface of first triangular slot 71. First wedge insert 70 lodges into place in first triangular slot 71 when the bent lip 75 snaps past the lower edge 76 of the inside hypotenuse surface 77 as wedge 70 is completely inserted into slot 71.

FIG. 12 is a cross-sectional, schematic view of first wedge insert 70 having been snapped into first triangular slot 71. When first wedge insert 70 is snapped into first triangular slot 71, the bent lip 75 projects out of the cutout at the bottom of the slanted surface of first triangular slot 71.

Figures 13, 14:
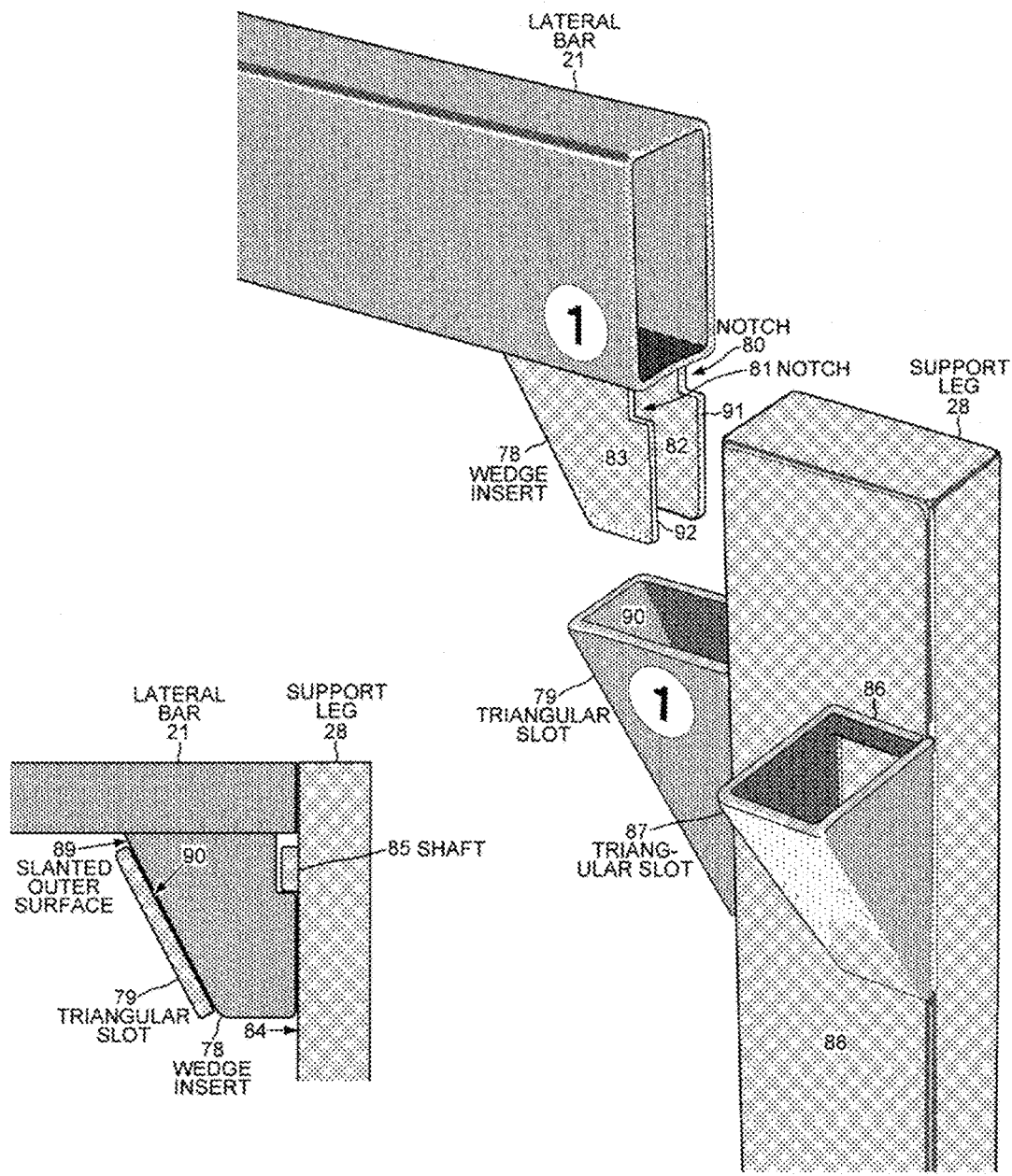
FIG. 13 shows yet another embodiment of the bed frame of FIG. 2 in which a wedge snaps into a slot when a notch on the wedge snaps past a shaft of the slot.
FIG. 14 is a cross-sectional, schematic view of the wedge insert of FIG. 13 having been snapped into a triangular slot.

FIG. 13 shows yet another embodiment of bed frame assembly 20 in which the wedge inserts achieve an enhanced snap when they are lodged in the triangular slots. FIG. 13 illustrates how a wedge insert 78 on lateral bar 21 snaps into a triangular slot 79 on support leg 28. The wedge insert 78 has a notch 80-81 in each of its triangular sides 82-83. Each notch 80-81 of wedge insert 78 faces the side 84 of support leg 28 on which triangular slot 79 is mounted. Triangular slot 79 has a shaft 85 (not visible in FIG. 13) that fits into each notch 80-81 when wedge insert 78 is completely inserted into triangular slot 79.

FIG. 13 shows the analogous shaft 86 on the second triangular slot 87 on support leg 28. Shaft 86 is part of the bent sheet of metal from which triangular slot 87 is made and is formed by making an additional bend in that sheet. The sheet of metal is cut so that shaft 86 is a narrow section that projects from the remainder of the shape of the sheet. Triangular slot 87 is then formed from the bent sheet by welding the two vertical edges to the side 88 of support leg 28. The shaft 86 is also welded to the side 88 of support leg 28. Returning to triangular slot 79, each notch 80-81 of wedge insert 78 snaps past the shaft 85 and wedges insert 78 into slot 79 as the slanted outer surface 89 of wedge insert 78 is slid down along the inside hypotenuse surface 90 of triangular slot 79. The vertical edges 91-92 of the open vertical side of wedge insert 78 are pressed against the side 84 of support leg 28 on which triangular slot 79 is mounted.

FIG. 14 is a cross-sectional, schematic view of wedge insert 78 having been snapped into triangular slot 79. When wedge insert 78 is snapped into triangular slot 79, the notches 80-81 are prevented from moving back up and out of triangular slot 79 by the shaft 85.

Bed frame assembly 20 is manufactured by stamping out the appropriately shaped metal sheets that are then bent and welded to the bars 21-24 and support legs 25-28 to form the wedge inserts 43-50 and triangular slots 33-34 and 37-42. Then the ledges 31-32 are welded to the longitudinal bars 23-24, and strips 68 of hook and loop fastening material are glued to the ledges 31-32. Stickers with the appropriate numerals are then stuck to the triangular slots and near or on the wedge inserts. The ends of the slats 30 are then connected by ribbons 69 made of strong synthetic fabric. Finally, the bed frame assembly 20 is assembled in the factory to ensure that all of the components fit properly.

After the test assembly in the factory, first wedge insert 43 must be removed from first triangular slot 33, the second wedge insert 44 must be removed from the second triangular slot 34, and the other wedge inserts must be removed from their corresponding triangular slots. Then the lateral bars 21-22, the longitudinal bars 23-24, the support legs 25-28 and the wooden slats 30 are inserted into a packing box. In an alternative embodiment, user instructions are also inserted into the packing box that instruct the user of the assemblable bed frame assembly 20 to insert the first wedge insert 43 into the first triangular slot 33 and to insert the second wedge insert 44 into the second triangular slot 34. In addition, the instructions instruct the user to place the wooden slats 30 between the first longitudinal bar 23 and the second longitudinal bar 24. And the instructions indicate that the mattress should be placed on the wooden slats.

Figure 15:
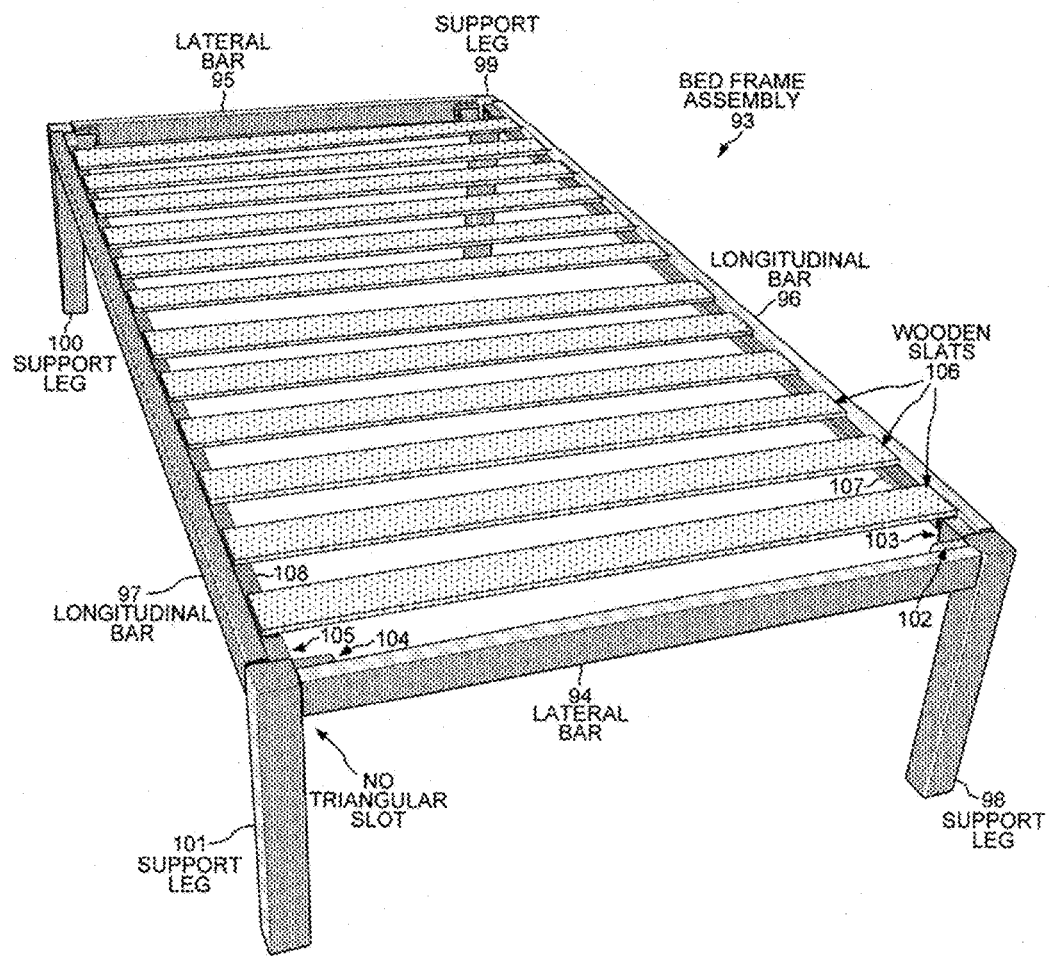
FIG. 15 is a perspective view of another embodiment of an easily assembled bed frame.

FIG. 15 is a perspective view of another embodiment of a sturdy bed frame assembly 93 that can be easily assembled without tools by inserting wedge inserts into slots. The wedge inserts of assembly 93 are not attached below the bars, however, and are not visible from the sides of the bed frame assembly. The wedge inserts are attached to the ends of the bars on the inner sides so that only the bars and the leg supports are visible after assembly from the sides of the bed frame.

FIG. 15 shows bed frame assembly 93 in an assembled state. A mattress can be placed directly on bed frame assembly 93 without any intervening box springs. Although FIG. 15 shows a twin sized version of the bed frame assembly 93, queen and king sized versions can be made using the same wedge inserts and slots. Bed frame assembly 93 has only eight metal components. The queen sized version can also be made from just eight metal pieces, while the king sized version includes an additional bar and legs.

Bed frame assembly 93 includes two lateral bars 94-95, two longitudinal bars 96-97 and four support legs 98-101. Each of the support legs 98-101 has two slots, and each of the bars 94-97 has two wedge inserts. In FIG. 15, two wedge inserts 102-103 are labeled on support leg 98, and two wedge inserts 104-105 are labeled on support leg 101. In addition, bed frame assembly 93 includes twelve wooden slats 106 that span between the two longitudinal bars 96-97. The ends of the wooden slats 106 rest on metal ledges 107-108 that are welded to the inner sides of the longitudinal bars 96-97. Strips of hook-and-loop fastening material hold the wooden slats 106 to the ledges 107-108. For example, a fabric ribbon of hooks is glued to ledge 107, and a fabric ribbon of loops is stapled to the ends of the slats 106. The hook strip on the bar then attaches to the loop strip on the slats.

The metal ledges 31-32 are positioned lower on the inner sides of the longitudinal bars 96-97 such that the upper surfaces of the wooden slats 106 are below the top sides of the longitudinal bars 96-97 and below the upper sides of the lateral bars 94-95. The tops of the longitudinal and lateral bars form a lip around the upper surfaces of the wooden slats 106 on which the mattress rests. This lip holds the mattress in place and prevents the mattress from sliding past the head or foot of bed frame assembly 93 without using any edge attachments attached to the longitudinal bars.

Figure 16:
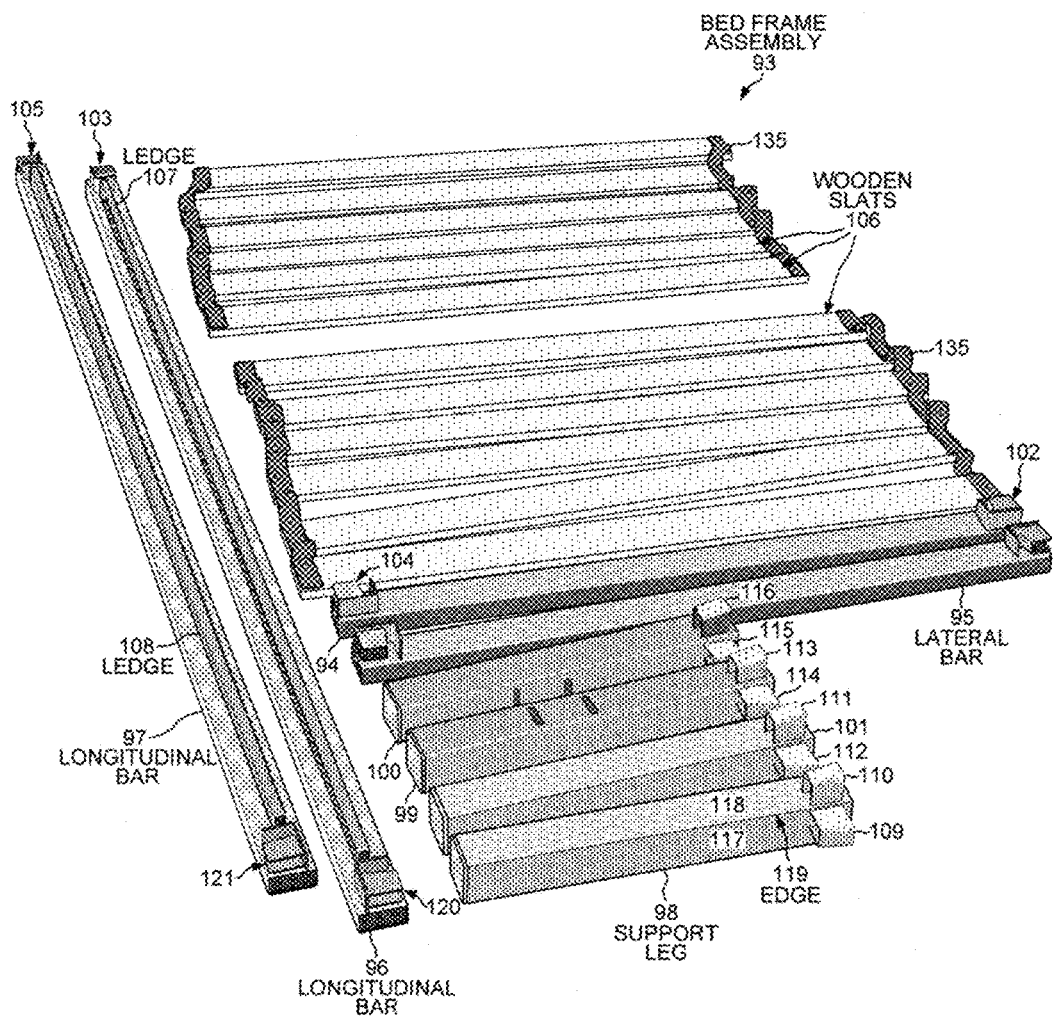
FIG. 16 shows the components of the bed frame of FIG. 15 in an unassembled state.

FIG. 16 shows bed frame assembly 93 in an unassembled state such as how the components would appear when the customer first removes them from the packing box in which they were shipped to the customer. FIG. 16 shows that each support leg 98-101 has two slots. For example, first support leg 98 has a first slot 109 and a second slot 110. Support legs 99-101 have slots 111-116. First support leg 98 has a first side 117 that is perpendicular to a second side 118. First side 117 meets second side 118 at edge 119. The first slot 109 is attached to the first side 117, and the second slot 110 is attached to the second side 118. Thus, the first slot 109 extends from the first support leg 98 in a direction perpendicular to the direction at which the second slot 110 extends from the first support leg 98. The second support leg 99 has two slots 113-114; the third support leg 100 has two slots 115-116; and the fourth support leg 101 has two slots 111-112. FIG. 16 also shows that each of the bars 94-97 includes two wedge retention insert fasteners. For example, the first lateral bar 94 has two wedge inserts 102 and 104. The first longitudinal bar 96 has two wedge inserts 103 and 120. The second longitudinal bar 97 has two wedge inserts 105 and 121.

FIG. 16 also shows the fabric ribbons 135 of hook-and-loop fastening material that are attached to the ends of the wooden slats 106. The fabric ribbons attach the wooden slats in two groups of six to one another and allow the slats to be rolled out over complementary ribbons of fastening material on the ledges 107-108 after the metal portions of the bed frame assembly 93 have been assembled.

In a manner similar to that employed with bed frame assembly 20, each wedge insert of bed frame assembly 93 is identified by a numeral that corresponds to the numeral displayed on the slot into which the particular wedge insert must be inserted in order to assemble the assembly. Identifying wedge inserts and their corresponding slots by number enables the user intuitively to assemble the bed frame by inserting each wedge insert into the correct slot.

Figures 17, 18:
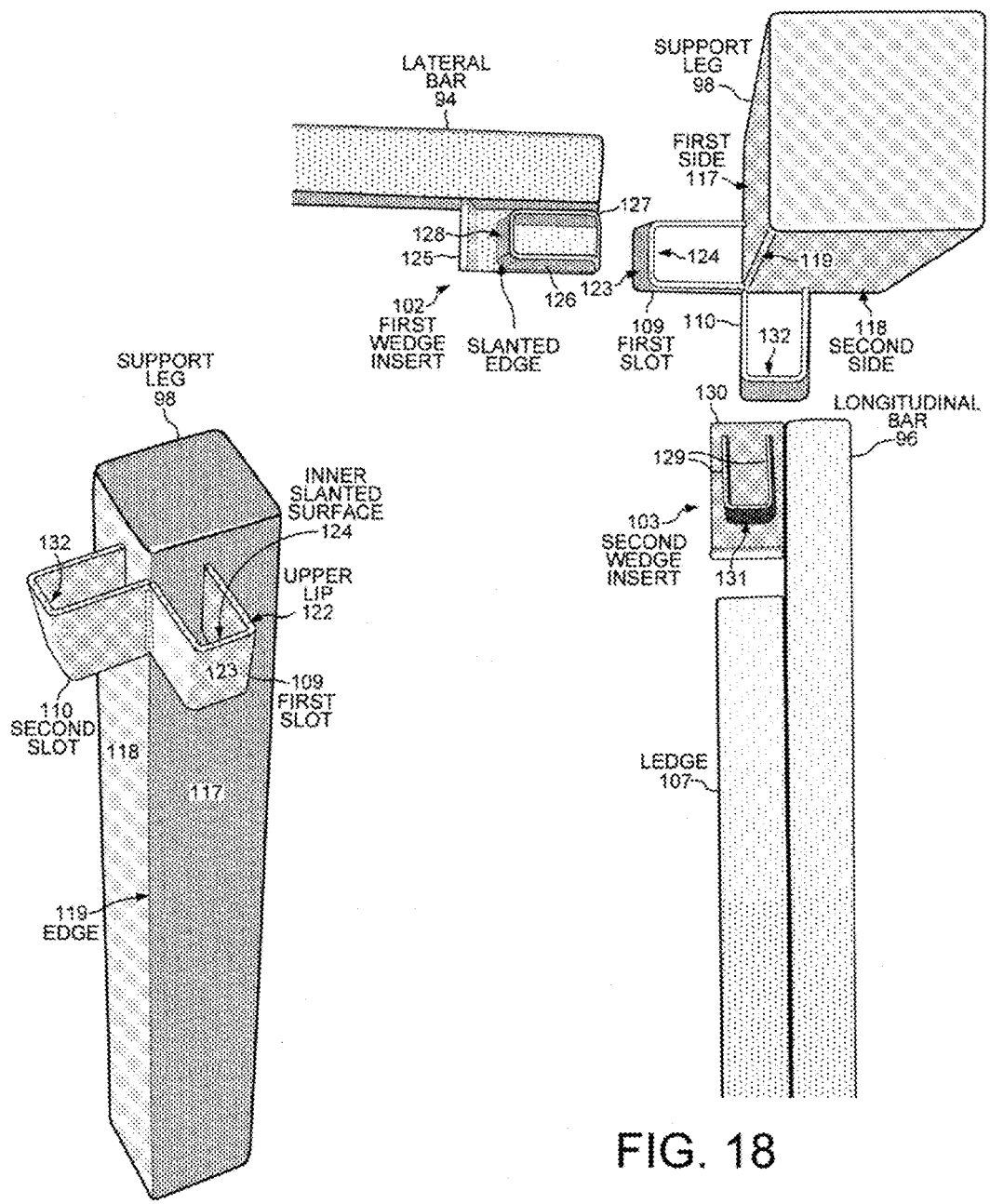
FIG. 17 is a more detailed view of a support leg to which slots are attached as shown in FIG. 16.
FIG. 18 is a view of the support leg and slots of FIG. 17 looking up from the bottom of the leg and also showing corresponding wedge inserts on lateral and longitudinal bars.

FIG. 17 is a more detailed view of support leg 98 to which slots 109-110 are attached. First slot 109 is formed from a bent strip of metal welded along two edges to first side 117 of support leg 98. The strip of metal is cut in a pattern so that after being bent and welded to first side 117, the upper lip 122 of slot 109 is perpendicular to the first side. Slot 109 has a rectangular slot opening and a slanted side 123 opposite first side 117 of leg 98. There is an inner slanted surface 124 on the inside of the slanted side 123 of the first slot 109. FIG. 17 shows that first slot 109 is disposed on first side 117 adjacent to edge 119, and second slot 110 is disposed on second side 118 adjacent to edge 119. First slot 109 extends across approximately one half of the width of first side 117 allowing lateral bar 94 to occupy the other half of the width when first wedge insert 102 is lodged in first slot 109. Thus, support leg 98 is approximately twice as wide as lateral bar 94.

FIG. 18 is a view of support leg 98 looking up from the bottom of the leg. Slots 109-110 are seen from the bottom. Because side 123 of first slot 109 slants upward and outward, the rectangular opening at the bottom of slot 109 is smaller than the rectangular opening surrounded by upper lip 122 of slot 109. In FIG. 18, first slot 109 is shown from the smaller bottom rectangular opening. FIG. 18 also shows a bottom perspective view of first wedge insert 102 attached to lateral bar 94, and second wedge insert 103 attached to longitudinal bar 96. The wedge inserts 102-103 are welded at the ends of the bars 94 and 96.

First wedge insert 102 is formed by bending a sheet of metal into a U-shape, which is then welded to a bent plate 125. The arms of the U-shape form tongues 126-127 that are connected by a slanted side. Each of the insert tongues 126-127 has a slanted edge where the tongue meets the outer slanted surface 128 of the slanted side. The bent plate 125 is then welded to the inner side of lateral bar 94 at the end of the bar. When first wedge insert 102 is lodged in slot 109, the outer slanted surface 128 of first wedge insert 102 contacts and slides along the inner slanted surface 124 of first slot 109.

Second wedge insert 103 is made in an analogous manner. Insert tongues 129 are formed by bending a sheet of metal into a U-shape, which is then welded to a bent plate 130. Insert tongues 129 are connected by a slanted side that has an outer slanted surface 131. The bent plate 130 is welded to the inner side of longitudinal bar 96 at the end of the bar. The ledge 107 does not extend along the entire length of longitudinal bar 96 but rather ends before the location where second wedge insert 103 is welded to the inner side of the bar. When second wedge insert 103 is lodged in slot 110, the outer slanted surface 131 of second wedge insert 103 contacts and slides along the inner slanted surface 132 of second slot 110.

Figure 19:
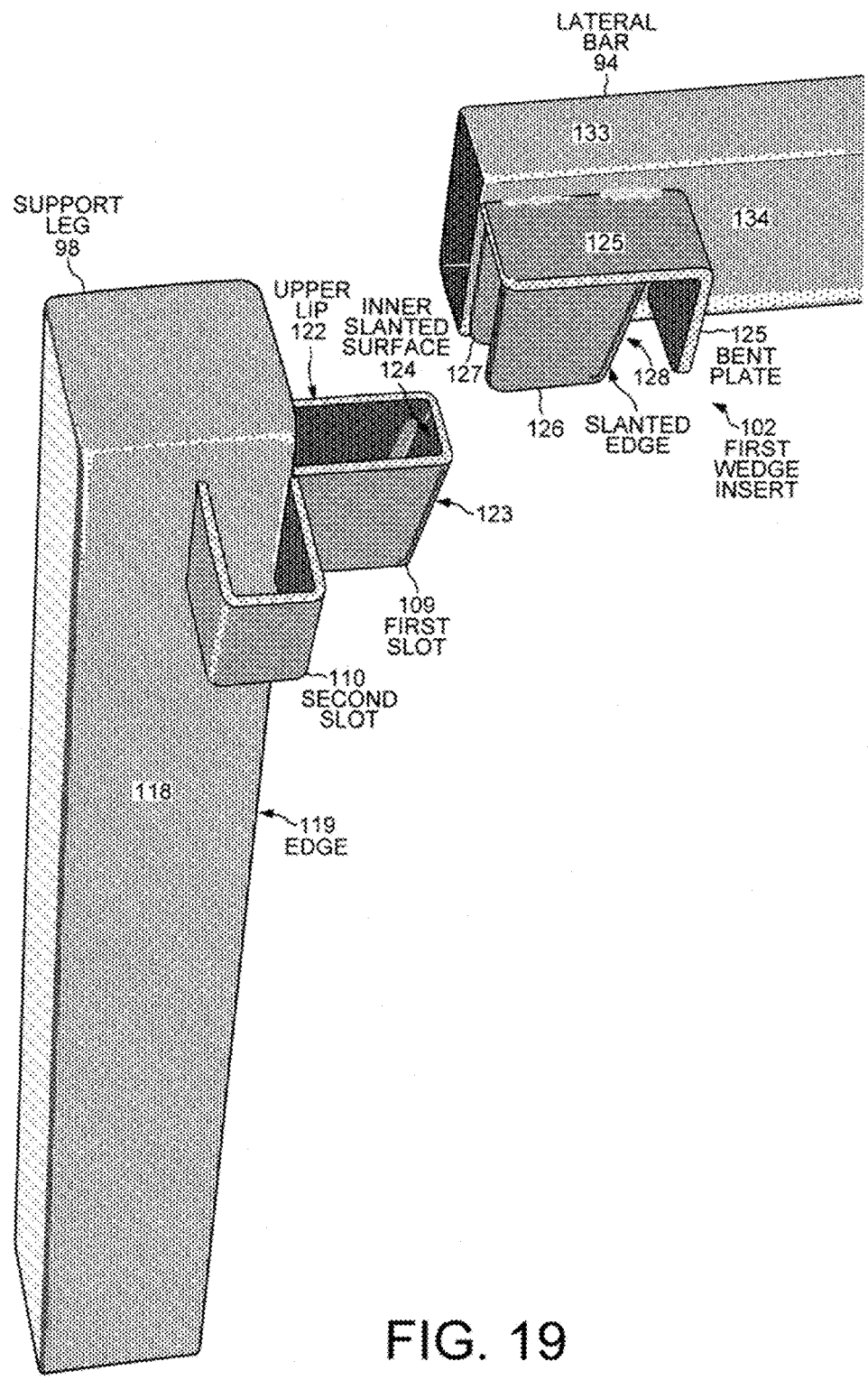
FIG. 19 illustrates how a wedge insert is inserted into a slot of the support leg of FIG. 17.

FIG. 19 illustrates how first wedge insert 102 is pushed down into first slot 109 in a first step of assembling bed frame assembly 93. As first wedge insert 102 is inserted into first slot 109, the slanted edges of insert tongues 126-127 slide down over the inner slanted surface 124 of first slot 109. When first wedge insert 102 is lodged in slot 109, the outer slanted surface 128 and the slanted edges of insert tongues 126-127 press against the inner slanted surface 124 of first slot 109, and the vertical edges of insert tongues 126-127 are pressed onto first side 117. Wedge insert 102 can be pushed down into first slot 109 by stamping the heal of one's shoe on the upper side 133 of lateral bar 94 adjacent to first wedge insert 102. The friction of the insert tongues 126-127 being pressed between the inner slanted surface 124 and the first side 117 retains the first wedge insert 102 in the first slot 109. First wedge insert 102 has no moving parts. No rotating fastener, such as a screw, bolt or pin, is used to hold wedge insert 102 in place in slot 109.

FIG. 19 illustrates that first wedge insert 102 has a first wedge angle formed between the outer slanted surface 128 and the vertical edges of insert tongues 126-127. First slot 109 forms a first slot angle between the inner slanted surface 124 and first side 117 that is approximately equal to the first wedge angle. Because the first wedge angle equals the first slot angle, the slanted edges of the insert tongues 126-127 make contact all along the inner slanted surface of first slot 109 while first wedge insert 102 is lodged in first slot 109.

FIGS. 18-19 show that insert tongue 127 is not directly attached to the inner side 134 of lateral bar 94. Instead, insert tongue 127 is welded to the upper portion of bent plate 125. Then bent plate 125 is welded to the inner side 134 of lateral bar 94. FIG. 19 shows two locations where the upper portion of bent pate 125 is welded to the inner side 134. In one embodiment, a hook is disposed at the bottom of the outer slanted surface 128 of first wedge insert 102. First wedge insert 102 snaps into first slot 109 when the hook catches on the lower edge of slanted side 123 of first slot 109 when the wedge is completely inserted into the slot.

FIG. 19 also shows that lateral bar 94 is hollow and has a rectangular cross section. In fact, all of the lateral and longitudinal bars 94-97 and the support legs 98-101 are made from hollow, rectangular metal bars. The hollow, rectangular metal construction of the bars provides a stronger structure than would solid bars of the same weight of metal.

Figure 20:
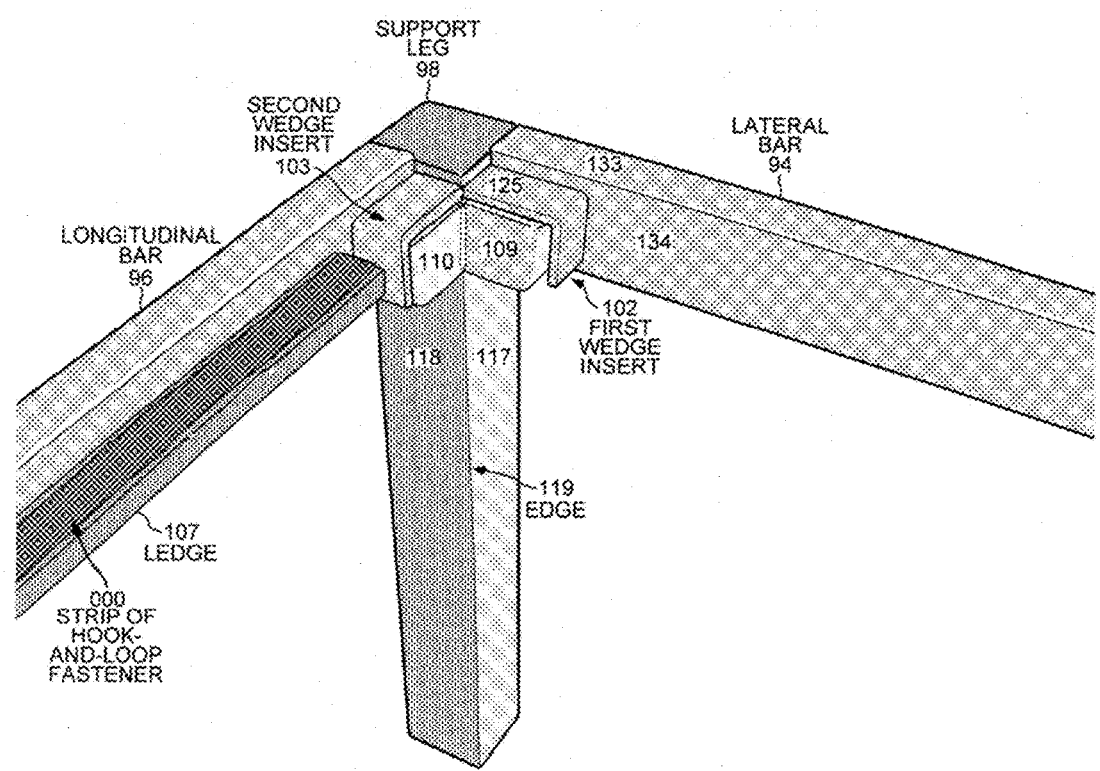
FIG. 20 shows a portion of the bed frame of FIG. 15 after both a lateral bar and a longitudinal bar have been attached to the support leg of FIG. 17.

FIG. 20 shows the assembly step after both lateral bar 94 and longitudinal bar 96 have been attached to support leg 98. By connecting first wedge insert 102 to first slot 109 and second wedge insert 103 to second slot 103, both lateral bar 94 and longitudinal bar 96 are connected to support leg 98. FIG. 20 shows that first slot 109 is disposed on first side 117 adjacent to edge 119 and that second slot 110 is disposed on second side 118 adjacent to edge 119. In one embodiment, a side of slot 109 and a side of slot 110 are attached to the first and second sides adjacent to edge 119 using the same weld, as shown in FIG. 20. Thus, first slot 109 contacts second slot 110.

In the assembled state when first wedge insert 102 is lodged in first slot 109, first wedge insert 102 is disposed between edge 119 and lateral bar 94. The connection between wedge insert 102 and slot 109 is not visible when viewing bed frame assembly 93 with a mattress is resting on top. In addition, second wedge insert 103 is disposed between edge 119 and longitudinal bar 96 while second wedge insert 103 is lodged in second slot 110. In the assembled state, support leg 98, lateral bar 94 and longitudinal bar 96 are all perpendicular to one another. Lateral bar 94 is oriented perpendicular to support leg 98 while first wedge insert 102 is lodged in first slot 109. Longitudinal bar 96 is oriented perpendicular to support leg 98 while second wedge insert 103 is lodged in second slot 110. Longitudinal bar 96 is perpendicular to both leg 98 and lateral bar 94 while both wedge inserts 102-103 are lodged in first and second slots 109-110. In the assembled state, first slot 109 and second slot 110 are disposed adjacent to one another and between lateral bar 94 and longitudinal bar 96 while first and second wedge inserts 102-103 are lodged in first and second slots 109-110. By connecting the remaining wedge inserts and slots that have matching numerals, a user can intuitively assemble bed frame assembly 93 without using instructions or tools. After the eight metal components of the bed frame 93 are assembled, the two rolls of wooden slats 106 are rolled out to span between the ledges 107-108 on the longitudinal bars 96-97.

Figure 21:
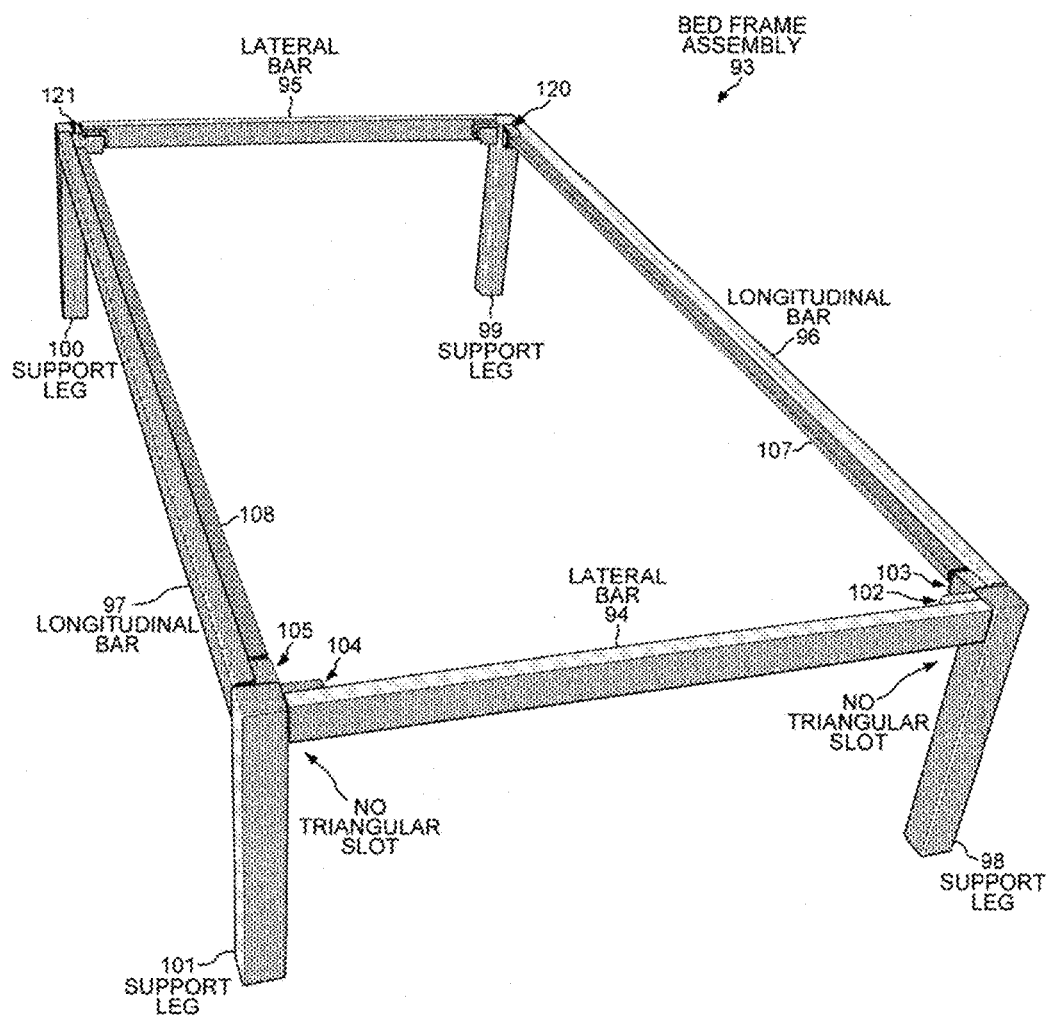
FIG. 21 shows the eight metal components of the bed frame of FIG. 15 after they have been assembled and before wooden slats have been placed over the bars.

FIG. 21 shows the eight metal components of bed frame assembly 93 after they have been assembled and before the wooden slats 106 have been rolled out over the ledges 107-108. In comparison to bed frame assembly 20, the wedge inserts and slots are disposed inside the four lateral and longitudinal bars instead of below the bars.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A bed frame assembly comprising:
a support leg with a first side, a second side, a first slot and a second slot, wherein the first side is perpendicular to the second side and meets the second side at an edge, wherein the first slot is disposed on the first side adjacent to the edge, and wherein the second slot is disposed on the second side adjacent to the edge;

a first wedge insert attached to a lateral bar, wherein the first wedge insert fits into the first slot, wherein the lateral bar is oriented perpendicular to the support leg while the first wedge insert is lodged in the first slot, wherein the first wedge insert is disposed between the edge and the lateral bar while the first wedge insert is lodged in the first slot, and wherein no portion of the first wedge insert is disposed below the lateral bar while the first wedge insert is lodged in the first slot; and a second wedge insert attached to a longitudinal bar, wherein the second wedge insert fits into the second slot, wherein the longitudinal bar is oriented perpendicular to the support leg while the second wedge insert is lodged in the second slot, and wherein the second wedge insert is disposed between the edge and the longitudinal bar while the second wedge insert is lodged in the second slot.

2. The bed frame assembly of claim 1, wherein the first wedge insert has a first wedge angle, and wherein the first slot forms a first slot angle that is approximately equal to the first wedge angle.

3. The bed frame assembly of claim 1, wherein the first wedge insert has two insert tongues and a bent plate, wherein the insert tongues are directly attached to the bent plate, and wherein the bent plate is directly attached to the lateral bar.

4. The bed frame assembly of claim 3, wherein the insert tongues fit into the first slot.

5. The bed frame assembly of claim 3, wherein each of the insert tongues has a slanted edge that contacts an inner slanted surface of the first slot while the first wedge insert is lodged in the first slot.

6. The bed frame assembly of claim 1, wherein the first wedge insert snaps into the first slot.

7. The bed frame assembly of claim 1, wherein the first slot has a rectangular slot opening.

8. The bed frame assembly of claim 1, wherein the first slot is formed by a bent sheet of metal welded to the first side.

9. The bed frame assembly of claim 1, wherein the first wedge insert is formed from a bent plate welded to a side of the lateral bar and insert tongues welded to the bent plate.

10. The bed frame assembly of claim 1, wherein only friction holds the first wedge insert in the first slot without using any rotating fastener.

11. A bed frame assembly comprising:
a leg that has a first slot and a second slot, wherein the first slot has a first inner slanted surface, and wherein the second slot has a second inner slanted surface;
a lateral bar that has a first wedge insert that is adapted to lodge in the first slot, wherein the first wedge insert has a first slanted outer surface that is adapted to contact the first inner slanted surface while the first wedge insert is lodged in the first slot, and wherein the lateral bar is perpendicular to the leg while the first wedge insert is lodged in the first slot; and
a longitudinal bar that has a second wedge insert that is adapted to lodge in the second slot, wherein the second wedge insert has a second slanted outer surface that is adapted to contact the second inner slanted surface while the second wedge insert is lodged in the second slot, wherein the longitudinal bar is perpendicular to the leg and perpendicular to the lateral bar while both the second wedge insert is lodged in the second slot and the first wedge insert is lodged in the first slot, and wherein the first slot and the second slot are disposed between the lateral bar and the longitudinal bar while the first and second wedge inserts are lodged in the first and second slots.

12. The bed frame assembly of claim 11, wherein no portion of the first slot and no portion of the first wedge insert are disposed below the lateral bar while the first wedge insert is lodged in the first slot.

13. The bed frame assembly of claim 11, wherein the leg has a first side and a second side that meet each other at an edge, wherein the first slot is disposed on the first side adjacent to the edge, and wherein the second slot is disposed on the second side adjacent to the edge.

14. The bed frame assembly of claim 11, wherein the first wedge insert snaps into the first slot.

15. The bed frame assembly of claim 11, further comprising:
a second longitudinal bar that is parallel to the longitudinal bar and perpendicular to the lateral bar while the first and second wedge inserts are lodged in the first and second slots; and
wooden slats that span between the longitudinal bar and the second longitudinal bar.

16. The bed frame assembly of claim 15, wherein the wooden slats are attached to one another by fabric ribbons.

17. The bed frame assembly of claim 11, wherein the longitudinal bar and the lateral bar are hollow and have rectangular cross sections.

18. A bed frame assembly comprising:
a leg with a first slot and a second slot, wherein the first slot is oriented perpendicular to the second slot;
a first wedge insert attached to a lateral bar, wherein the first wedge insert is adapted to fit into the first slot; and
a second wedge insert attached to a longitudinal bar, wherein the second wedge insert is adapted to fit into the second slot, wherein the first slot and the second slot are disposed adjacent to one another and between the lateral bar and the longitudinal bar while the first and second wedge inserts are lodged in the first and second slots, and wherein no portion of the first slot and no portion of the first wedge insert are disposed below the lateral bar while the first wedge insert is lodged in the first slot.

19. The bed frame assembly of claim 18, wherein the lateral bar is oriented perpendicular to the support leg while the first wedge insert is lodged in the first slot, and wherein the longitudinal bar is oriented perpendicular to the support leg while the second wedge insert is lodged in the second slot.

20. The bed frame assembly of claim 18, wherein the first wedge insert is formed from a bent plate welded to the lateral bar and insert tongues welded to the bent plate, and wherein the insert tongues are adapted to fit into the first slot.

* * * * *